US 8,605,904 B2

(12) United States Patent
Lin

(10) Patent No.: US 8,605,904 B2
(45) Date of Patent: Dec. 10, 2013

(54) SECURITY METHOD IN WIRELESS COMMUNICATION SYSTEM HAVING RELAY NODE

(75) Inventor: Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 392 days.

(21) Appl. No.: 12/855,720

(22) Filed: Aug. 13, 2010

(65) Prior Publication Data

US 2011/0038480 A1     Feb. 17, 2011

Related U.S. Application Data

(60) Provisional application No. 61/233,991, filed on Aug. 14, 2009.

(30) Foreign Application Priority Data

Aug. 9, 2010 (TW) ................................ 99126476 A

(51) Int. Cl.
*H04W 12/04*     (2009.01)
*H04W 12/06*     (2009.01)

(52) U.S. Cl.
USPC ............ 380/270; 380/278; 726/3; 370/310.2; 370/313; 370/328; 455/411; 455/422.1; 455/432.1; 455/436; 455/439

(58) Field of Classification Search
USPC ........................................................ 380/270
See application file for complete search history.

(56) References Cited

U.S. PATENT DOCUMENTS

| 6,587,680 | B1 * | 7/2003 | Ala-Laurila et al. .......... 455/411 |
| 6,778,828 | B1 | 8/2004 | Chander et al. |
| 7,882,346 | B2 * | 2/2011 | O'Neill et al. ................. 713/153 |
| 8,027,304 | B2 * | 9/2011 | Forsberg ........................ 370/331 |
| 8,185,935 | B2 * | 5/2012 | Hsu ..................................... 726/3 |
| 2002/0026527 | A1 * | 2/2002 | Das et al. ....................... 709/245 |
| 2002/0114469 | A1 * | 8/2002 | Faccin et al. .................. 380/270 |
| 2004/0024901 | A1 * | 2/2004 | Agrawal et al. ............... 709/238 |
| 2005/0163078 | A1 * | 7/2005 | Oba et al. ....................... 370/331 |

(Continued)

FOREIGN PATENT DOCUMENTS

| CN | 101040544 | 9/2007 |
| CN | 101500229 | 8/2009 |
| CN | 101500230 | 8/2009 |

OTHER PUBLICATIONS

Verizon Wireless, 'CDMA Network Security' Verizon Wireless White Paper, 2008, Verizon Wireless, entire document, http://businessportals.verizonwireless.com/assets/files/SecurityWP.pdf.*

(Continued)

*Primary Examiner* — Edan Orgad
*Assistant Examiner* — Ronald Baum
(74) *Attorney, Agent, or Firm* — Jianq Chyun IP Office

(57) ABSTRACT

A security method in a wireless communication system is provided, which is used for providing a plurality of security associations between a user equipment, a relay node, and a base station node in a wireless communication system. The user equipment authenticates with a serving gateway in the wireless communication system through the relay node, such that a security association between the user equipment and the relay node is established correspondingly. The relay node establishes a second security association between the relay node and the base station node through the base station node.

38 Claims, 16 Drawing Sheets

(56) References Cited

U.S. PATENT DOCUMENTS

| | | | |
|---|---|---|---|
| 2006/0126845 A1* | 6/2006 | Zheng | 380/270 |
| 2007/0249352 A1 | 10/2007 | Song et al. | |
| 2009/0068986 A1 | 3/2009 | Wang et al. | |
| 2009/0103492 A1 | 4/2009 | Altshuller et al. | |
| 2009/0156213 A1* | 6/2009 | Spinelli et al. | 455/436 |
| 2009/0271626 A1 | 10/2009 | Wang | |
| 2010/0329150 A1* | 12/2010 | Nielsen | 370/254 |

OTHER PUBLICATIONS

3GPP TS 33.401 V8.4.0 (Jun. 2009), 3rd Generation Partnership Project; Technical Specification Group Services and System Aspects; 3GPP System Architecture Evolution (SAE): Security architecture; 95pages.

3GPP TS 36.300 V8.8.0 (Mar. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 152pages.

3GPP TS 36.323 V8.6.0 (Jun. 2009), 3rd Generation Partnership Project; Technical Specification Group Radio Access Network; Evolved Universal Terrestrial Radio Access (E-UTRA); Packet Data Convergence Protocol (PDCP) specification; 24pages.

3GPP TS 36.331 V8.6.0 (Jun. 2009), 3rd Generation Partnership Project; Technical Specification Group Radio Access Network; Evolved Universal Terrestrial Radio Access (E-UTRA); Radio Resource Control (RRC); Protocol specification, 207pages.

3GPP TS 36.410 V8.2.0 (Mar. 2009), 3rd Generation Partnership Project; Technical Specification Group Radio Access Network; Evolved Universal Terrestrial Access Network (E-UTRAN); S1 General aspects and principles, 14pages.

3GPP TS 36.413 V8.6.1 (Jun. 2009), 3rd Generation Partnership Project; Technical Specification Group Radio Access Network; Evolved Universal Terrestrial Radio Access Network (E-UTRAN); S1 Application Protocol (S1AP), 218pages.

3GPP TS 36.420 V8.1.0 (Dec. 2008), 3rd Generation Partnership Project; Technical Specification Group Radio Access Network; Evolved Universal Terrestrial Radio Access Network (E-UTRAN); X2 general aspects and principles, 12pages.

3GPP TS 36.423 V8.6.0 (Jun. 2009), 3rd Generation Partnership Project; Technical Specification Group Radio Access Network; Evolved Universal Terrestrial Radio Access Network (E-UTRAN); X2 application protocol (X2AP), 100pages.

R2-093972, 3GPP TSG-RAN WG2 #66bis; Jun. 29-Jul. 3, 2009; Los Angeles, USA, title "Report of email discussion [66#22] on Relay architecture", 30pages.

R3-093305, 3GPP TSG-RAN WG3 #66, Nov. 9-13, 2009, Jeju, Korea, title "Text proposal to TR 36.806 on Relay Security over the Un interface", 10 pages.

"First Office Action of China Counterpart Application", issued on Dec. 18, 2012, p. 1-p. 30.

* cited by examiner

SECURITY METHOD IN WIRELESS COMMUNICATION SYSTEM HAVING RELAY NODE

CROSS-REFERENCE TO RELATED APPLICATION

This application claims the priority benefit of U.S. provisional application Ser. No. 61/233,991, filed on Aug. 14, 2009. This application also claims the priority benefits of Taiwan application serial no. 99126476, filed on Aug. 9, 2010. The entirety of each of the above-mentioned patent applications is hereby incorporated by reference herein and made a part of this specification.

BACKGROUND

1. Field of the Disclosure

The disclosure relates to a security method in a wireless communication system having a relay node, and a wireless communication system using the same.

2. Description of Related Art

Techniques for a wireless communication system are quickly developed, and a plurality of new standards is under development and improvement. For example, a long term evolution (LTE) system of 3rd Generation Partnership Project (3GPP) is now widely used by mobile equipment users. Referring to FIG. 1, FIG. 1 is a system schematic diagram illustrating an LTE system. The LTE system 1 includes a user equipment (UE) 11, a plurality of evolved Node Bs (eNBs, i.e. the base station nodes in 3GPP) 12, 13 and 14, and a plurality of mobile management entities/serving gateways (MMEs/S-GWs) 15 and 16, wherein the eNBs 12, 13 and 14 form an evolved universal terrestrial radio access network (E-UTRAN) 17.

The mobile management entities and the serving gateways of the MMEs/S-GWs 15 and 16 may be integrated in the single one equipment, in other examples, the mobile management entities and the serving gateways of the MMEs/S-GWs 15 and 16 may also be separated equipments. The user equipment 11 can communicate with the eNB 12 through a Uu interface defined by 3GPP, and the Uu interface can be a wireless interface. The eNBs 12, 13 and 14 can communicate with each other through an X2 interface defined by 3GPP. The MME/S-GW 15 communicates with the eNBs 12 and 13 through an S1 interface, and the MME/S-GW 16 communicates with the eNBs 13 and 14 through an S1 interface.

A protocol stack of the LTE system 1 can be divided into two planes, wherein one is a user plane, and another one is a control plane. The user plane is used for data transmission, and the control plane is used for transmitting control information to control the data transmission. Security approaches of the LTE system 1 include ciphering and integrity protection. The integrity protection may protect data from altering, and the ciphering may protect the data from eavesdropping.

Referring to FIG. 2, FIG. 2 is a schematic diagram illustrating a key hierarchy in the LTE system. A key K is stored in a universal subscriber identity module (USIM) of a universal integrated chip card (UICC), and stored in an authentication centre (AuC). During an authentication and key agreement (AKA) procedure, the UE and a home subscriber server (HSS) generate a set of corresponding keys CK and CIK according to the key K. After the AKA procedure is completed, the UE and the MME obtain a result of the AKA procedure execution, i.e. a security management key $K_{ASME}$.

By executing a non-access layer (NAS) security mode command procedure, the UE and the MME may obtain a NAS ciphering key $K_{NAS\ enc}$ and a NAS integrity key $K_{NAS\ int}$ according to the security management key $K_{ASME}$, and obtain an eNB key $K_{eNB}$, wherein the MME can transmit the eNB key $K_{eNB}$ to the eNB through the S1 interface.

Then, by executing an access layer (AS) security mode command procedure, the eNB and the UE can obtain a user plane ciphering key $K_{UP\ enc}$, a radio resource control ciphering key $K_{RRC\ enc}$ and a radio resource control integrity key $K_{RRC\ int}$ according to the eNB key $K_{eNB}$. In case of hazard, the security management key $K_{ASME}$ and the eNB key $K_{eNB}$ are transmitted to a network handling procedure NH for processing, and the eNB key $K_{eNB}$ and a processing result of the network handling procedure NH are transmitted to a network control centre (NCC) for determination, so as to generate a complementary eNB key $K_{eNB*}$ to update the eNB key $K_{eNB}$. By training the eNB key $K_{eNB}$ for multiple times, the correct eNB key $K_{eNB}$ can be obtained, so as to obviate the hazard.

Then, referring to FIG. 3, FIG. 3 is a flowchart illustrating a security method of an LTE system. The LTE system 3 includes a UE 31, an eNB 32, an MME/S-GW 33 and a HSS 34.

First, in step S31, the AKA procedure is executed, so that the UE 31, the MME/S-GW 33 and the HSS 34 obtain the security management key $K_{ASME}$.

Then, in step S32, the NAS security mode command procedure is executed, so that the UE 31 and the eNB 32 obtain the eNB key $K_{eNB}$, and the UE 31 and the MME/S-GW 33 obtain the NAS ciphering key $K_{NAS\ enc}$ and the NAS integrity key $K_{NAS\ int}$. Moreover, in the step S32, the UE 31 goes to ECM-CONNECTED state defined by 3 GPP.

Then, in step S33, the AS security mode command procedure is executed, so that the UE 31 and the eNB 32 obtain the user plane ciphering key $K_{UP\ enc}$, the radio resource control ciphering key $K_{RRC\ enc}$ and the radio resource control integrity key $K_{RRC\ int}$. A purpose of the step S33 is to activate a radio resource control security.

After execution of the security method of the LTE system 3 is completed, in step S34, the UE 31 and the eNB 32 can perform general operations, for example, bi-direction security data transmission and bi-direction security control signal transmission.

The AKA procedure of the step S31 includes steps S311, S312 and S313. In the step S311, the MME/S-GW 33 transmits an authentication data request to the HSS 34, and the HSS 34 receives the authentication data request and transmits an authentication data response to the MME/S-GW 33. In this way, the MME/S-GW 33 can obtain the security management key $K_{ASME}$.

Then, in the step S312, the MME/S-GW 33 sends "user authentication request (RAND, AUTN, $KSI_{ASME}$)" defined by 3GPP to the UE 31. After the UE 31 receives the user authentication request, if the UE 31 accepts the authentication request of the MME/S-GW 33, the UE 31 sends "user authentication response" to the MME/S-GW 33. In this way, the UE 31 can obtain the security management key $K_{ASME}$. The above "user authentication request (RAND, AUTN, $KSI_{ASME}$)" represents a user authentication request carrying information of RAND, AUTN, $KSI_{ASME}$, etc., wherein RAND represents a random number, AUTN represents an authentication number, and $KSI_{ASME}$ represents a key group identification corresponding to the security management key $K_{ASME}$.

Then, in the step S313, the UE 31 executes a key derivation function (KDF) to obtain the security management key $K_{ASME}$.

The NAS security mode command procedure of the step S32 includes steps S321, S322 and S323. In the step S321, the MME/S-GW 33 executes the KDF, so as to obtain the NAS ciphering key $K_{NAS\ enc}$ and the NAS integrity key $K_{NAS\ int}$ according to the security management key $K_{ASME}$.

In the step S322, the UE 31 executes the KDF, so as to obtain the NAS ciphering key $K_{NAS\ enc}$ and the NAS integrity key $K_{NAS\ int}$ according to the security management key $K_{ASME}$, and obtain the eNB key $K_{eNB}$.

In the step S323, the MME/S-GW 33 sets an S1 context through the S1 interface, and a result that the MME/S-GW 33 executes the KDF is sent to eNB 32, so that the eNB 32 obtains the eNB key $K_{eNB}$. A value of the eNB key $K_{eNB}$ relates to the security management key $K_{ASME}$. An executing sequence of the steps S323 and S322 is not limited.

The AS security mode command procedure of the step S33 includes steps S331 and S334. In the step S331, the eNB 32 executes the KDF, so as to obtain the user plane ciphering key $K_{UP\ enc}$, the radio resource control ciphering key $K_{RRC\ enc}$ and the radio resource control integrity key $K_{RRC\ int}$ according to the eNB key $K_{eNB}$.

In the step S334, the UE 31 executes the KDF, so as to obtain the user plane ciphering key $K_{UP\ enc}$, the radio resource control ciphering key $K_{RRC\ enc}$ and the radio resource control integrity key $K_{RRC\ int}$ according to the eNB key $K_{eNB}$. An executing sequence of the steps S331 and S334 is not limited.

To effectively extend a coverage range of the eNB, a relay node can be added in the LTE system, so as to relay data and control signals transferred between the UE and the eNB. In present 3GPP, the relay node can be regarded as an eNB, though present 3GPP does not specify and resolve security problems between the relay node and the UE and between the relay node and the eNB.

Referring to FIG. 4, FIG. 4 is a schematic diagram illustrating a security problem between a relay node and an eNB. In the example of FIG. 4, an LTE system 4 regards a relay node (RN) 42 as an eNB of a UE 41. First, in step S41, the AKA procedure is executed. Therefore, the UE 41 and an MME/S-GW 44 can obtain a security management key $K_{ASME}$.

Then, in step S42, the NAS security mode command procedure is executed. Therefore, the MME/S-GW 44 and the UE 41 can obtain an NAS ciphering key $K_{NAS\ enc}$ and an NAS integrity key $K_{NAS\ int}$, and the UE 41 and the RN 42 can obtain an eNB key $K_{eNB}$.

In step S43, the AS security mode command procedure is executed, so that a radio resource control security is activated. Therefore, the UE 41 and the RN 42 can obtain a user plane ciphering key $K_{UP\ enc}$, a radio resource control ciphering key $K_{RRC\ enc}$ and a radio resource control integrity key $K_{RRC\ int}$.

However, present 3GPP does not define and specify a step S44 in FIG. 4. In other words, a key hierarchy, a key distribution procedure and a key distribution event between the RN 42 and the eNB 43 or between the RN 42 and the MME/S-GW 44 are not defined and specified.

In overall, in FIG. 4, present 3GPP can only be used to establish a security association (SA) SA41 specified by 3GPP released version 8 (Rel-8) between the UE 41 and the RN 42 through the Uu interface, and 3GPP Rel-8 cannot be used to establish an unknown security association SA 42 between the RN 42 and the eNB 43.

Then, referring to FIG. 5, FIG. 5 is a schematic diagram illustrating another security problem between a relay node and an eNB. In the example of FIG. 5, an LTE system 5 regards a RN 52 as a UE of an eNB 53. First, in step S51, the AKA procedure is executed. Therefore, a UE 51 and an MME/S-GW 54 can obtain a security management key $K_{ASME}$.

Then, in step S52, the NAS security mode command procedure is executed. Therefore, the MME/S-GW 54 and the UE 51 can obtain an NAS ciphering key $K_{NAS\ enc}$ and an NAS integrity key $K_{NAS\ int}$, and the UE 51 and the eNB 53 can obtain an eNB key $K_{eNB}$.

In step S53, the AS security mode command procedure is executed, so that the radio resource control security is activated. Therefore, the UE 51 and the eNB 53 can obtain a user plane ciphering key $K_{UP\ enc}$, a radio resource control ciphering key $K_{RRC\ enc}$ and a radio resource control integrity key $K_{RRC\ int}$.

However, present 3GPP (i.e. 3GPP Rel-8) does not define and specify a step S54 in FIG. 5. In other words, a key hierarchy, a key distribution procedure and a key distribution event between the RN 52 and the eNB 53 are not defined and specified.

In overall, in FIG. 5, present 3GPP can only be used to establish a security association SA51 specified by the third generation mobile communication technology standards released version 8 between the UE 51 and the eNB 53 through the Uu interface, and present 3GPP cannot be used to establish an unknown security association SA 42 between the RN 52 and the eNB 53.

SUMMARY OF THE DISCLOSURE

An exemplary embodiment of the disclosure provides a security method in a wireless communication system, which is used for providing a plurality of security associations between a user equipment, a relay node, and a base station node in the wireless communication system. The user equipment authenticates with a serving gateway in the wireless communication system through the relay node, such that a first security association between the user equipment and the relay node is established correspondingly. The relay node establishes a second security association between the relay node and the base station node through the base station node.

An exemplary embodiment of the disclosure provides a security method in a wireless communication system, which is used for providing a plurality of security associations between a user equipment, a relay node, and a base station node in the wireless communication system. The user equipment authenticates with a serving gateway in the wireless communication system through the base station node, such that a first security association between the user equipment and the base station node is established correspondingly. The relay node establishes a second security association between the relay node and the base station node through the base station node.

An exemplary embodiment of the disclosure provides a security method in a wireless communication system, which is used for providing a security association between a user equipment, a relay node, and a base station node in the wireless communication system. The user equipment to authenticates with a serving gateway in the wireless communication system through the base station node, such that the security association between the user equipment and the base station node is established correspondingly. The relay node transparently transfers data and control signals transmitted between the user equipment and the base station node without performing an encryption/decryption operation on the data and control signals.

An exemplary embodiment of the disclosure provides a security method in a wireless communication system, which is used for providing a plurality of security associations between a user equipment, a relay node, and a base station node in the wireless communication system. The relay node performs authentication with a serving gateway in the wireless communication system through the base station node, so as to obtain a first security management key belonged to the relay node. The relay node executes a first far-end data security mode command procedure, so as to obtain a first far-end data ciphering key, a first far-end data integrity key and a first base station node key belonged to the relay node according to the first security management key. The relay node executes a first near-end data security mode command procedure, so as to obtain a first near-end data ciphering key, a first near-end control signal ciphering key and a first near-end control signal integrity key belonged to the relay node according to the first base station node key, and accordingly establish a first security association between the relay node and the base station node. The user equipment to authenticates with the serving gateway through the relay node, so that the user equipment obtains a second security management key belonged to the user equipment. After the user equipment executes a second far-end data security mode command procedure, the relay node obtains a second base station node key belonged to the user equipment, wherein the second base station node key is generated according to the second security management key. After the user equipment executes a second near-end data security mode command procedure, the relay node obtains a second near-end data ciphering key, a second near-end control signal ciphering key and a second near-end control signal integrity key belonged to the user equipment according to the second base station node key, so as to establish a second security association between the user equipment and the relay node.

An exemplary embodiment of the disclosure provides a security method in a wireless communication system, which is used for providing a plurality of security associations between a user equipment, a relay node, and a base station node in the wireless communication system. The base station node obtains a first base station node key belonged to the relay node through a transmission interface between the base station node and the relay node, so that the relay node and the base station node obtain a first near-end data ciphering key, a first near-end control signal ciphering key and a first near-end control signal integrity key belonged to the relay node according to the first base station node key, so as to establish a first security association between the relay node and the base station node, wherein the first base station node key is generated according to a first security management key belonged to the relay node. The user equipment to authenticate with a serving gateway in the wireless communication system through the relay node, so that the user equipment obtains a second security management key belonged to the user equipment. After the user equipment executes a second far-end data security mode command procedure, the relay node obtains a second base station node key belonged to the user equipment, wherein the second base station node key is generated according to the second security management key. After the user equipment executes a second near-end data security mode command procedure, the relay node obtains a second near-end data ciphering key, a second near-end control signal ciphering key and a second near-end control signal integrity key belonged to the user equipment according to the second base station node key, so as to establish a second security association between the user equipment and the relay node.

An exemplary embodiment of the disclosure provides a security method in a wireless communication system, which is used for providing a plurality of security associations between a user equipment, a relay node, and a base station node in the wireless communication system. The user equipment authenticates with a serving gateway in the wireless communication system through the relay node, so that the user equipment obtains a security management key belonged to the user equipment. After the user equipment executes a far-end data security mode command procedure, the relay node obtains a base station node key belonged to the user equipment, wherein the base station node key is generated according to the security management key. After the user equipment executes a near-end data security mode command procedure, the relay node obtains a near-end data ciphering key, a near-end control signal ciphering key and a near-end control signal integrity key belonged to the user equipment according to the base station node key, so as to establish a first security association between the user equipment and the relay node. The base station node obtains the base station node key through a transmission interface between the base station node and the relay node, so that the base station node obtains the near-end data ciphering key, the near-end control signal ciphering key and the near-end control signal integrity key according to the base station node key, so as to establish a second security association between the relay node and the base station node.

An exemplary embodiment of the disclosure provides a security method in a wireless communication system, which is used for providing a plurality of security associations between a user equipment, a relay node, and a base station node in the wireless communication system. The user equipment authenticates with a serving gateway in the wireless communication system through the relay node, so that the user equipment obtains a security management key belonged to the user equipment. After the user equipment executes a far-end data security mode command procedure, the relay node obtains a base station node key belonged to the user equipment, wherein the base station node key is generated according to the security management key. After the user equipment executes a near-end data security mode command procedure, the relay node obtains a near-end data ciphering key, a near-end control signal ciphering key and a near-end control signal integrity key belonged to the user equipment according to the base station node key, and accordingly establish a first security association between the user equipment and the relay node. The base station node obtains the near-end data ciphering key, the near-end control signal ciphering key and the near-end control signal integrity key through a transmission interface between the base station node and the relay node, so as to establish a second security association between the relay node and the base station node.

An exemplary embodiment of the disclosure provides a security method in a wireless communication system, which is used for providing a plurality of security associations between a user equipment, a relay node, and a base station node in the wireless communication system. The base station node obtains a first near-end data ciphering key, a first near-end control signal ciphering key and a first near-end control signal integrity key belonged to the relay node through a transmission interface between the base station node and the relay node, so as to establish a first security association between the relay node and the base station node, wherein a first base station node key belonged to the relay node is generated according to a first security management key belonged to the relay node, and the first near-end data ciphering key, the first near-end control signal ciphering key and the first near-end control signal integrity key are generated according to the first base station node key. The user equipment authenticates with a serving gateway in the wireless communication system through the relay node, so that the user equipment obtains a second security management key belonged to the user equipment. After the user equipment executes a second far-end data security mode command procedure, the relay node obtains a second base station node key belonged to the user equipment, wherein the second base station node key is generated according to the second security management key. After the user equipment executes a second near-end data security mode command procedure, the relay node obtains a second near-end data ciphering key, a second near-end control signal ciphering key and a second near-end control signal integrity key belonged to the user equipment according to the second base station node key, so as to establish a second security association between the user equipment and the relay node.

An exemplary embodiment of the disclosure provides a security method in a wireless communication system, which is used for providing a plurality of security associations between a user equipment, a relay node, and a base station node in the wireless communication system. The user equipment to authenticate with a serving gateway in the wireless communication system through the relay node, so that the user equipment obtains a security management key belonged to the user equipment. After the user equipment executes a far-end data security mode command procedure, the relay node obtains a base station node key belonged to the user equipment, wherein the base station node key is generated according to the security management key. After the user equipment executes a near-end data security mode command procedure, the relay node obtains a near-end data ciphering key, a near-end control signal ciphering key and a near-end control signal integrity key belonged to the user equipment according to the base station node key, and accordingly establish a first security association between the user equipment and the relay node. When the user equipment executes a far-end data security mode command procedure, the base station obtains the base station node key generated according to the security management key. The base station node obtains the near-end data ciphering key, the near-end control signal ciphering key and the near-end control signal integrity key according to the base station node key, so as to establish a second security association between the relay node and the base station node.

An exemplary embodiment of the disclosure provides a security method in a wireless communication system, which is used for providing a plurality of security associations between a user equipment, a relay node, and a base station node in the wireless communication system. The user equipment performs authentication with a serving gateway in the wireless communication system through the base station node, so as to obtain a security management key belonged to the user equipment. The user equipment executes a far-end data security mode command procedure, so as to obtain a far-end data ciphering key, a far-end data integrity key and a base station node key belonged to the user equipment according to the security management key. The user equipment executes a near-end data security mode command procedure, so as to obtain a near-end data ciphering key, a near-end control signal ciphering key and a near-end control signal integrity key belonged to the user equipment according to the base station node key, and accordingly establish a first security association between the user equipment and the base station node. The relay node obtains the near-end data ciphering key, the near-end control signal ciphering key and the near-end control signal integrity key through a radio bearer transfer between the base station node and the relay node, so as to establish a second security association between the relay node and the base station node.

An exemplary embodiment of the disclosure provides a security method in a wireless communication system, which is used for providing a plurality of security associations between a user equipment, a relay node, and a base station node in the wireless communication system. The user equipment performs authentication with a serving gateway in the wireless communication system through the base station node, so as to obtain a security management key belonged to the user equipment. The user equipment executes a far-end data security mode command procedure, so as to obtain a far-end data ciphering key, a far-end data integrity key and a base station node key belonged to the user equipment according to the security management key. The user equipment executes a near-end data security mode command procedure, so as to obtain a near-end data ciphering key, a near-end control signal ciphering key and a near-end control signal integrity key belonged to the user equipment according to the base station node key, and accordingly establish a first security association between the user equipment and the base station node. The relay node obtains the base station node key through a radio bearer transfer between the base station node and the relay node, so that the relay node obtains the near-end data ciphering key, the near-end control signal ciphering key and the near-end control signal integrity key according to the base station node key, so as to establish a second security association between the relay node and the base station node.

An exemplary embodiment of the disclosure provides a security method in a wireless communication system, which is used for providing a plurality of security associations between a user equipment, a relay node, and a base station node in the wireless communication system. The user equipment performs authentication with a serving gateway in the wireless communication system through the base station node, so as to obtain a first security management key belonged to the user equipment. The user equipment executes a first far-end data security mode command procedure, so as to obtain a first far-end data ciphering key, a first far-end data integrity key and a first base station node key belonged to the user equipment according to the first security management key. The user equipment executes a first near-end data security mode command procedure, so as to obtain a first near-end data ciphering key, a first near-end control signal ciphering key and a first near-end control signal integrity key belonged to the user equipment according to the first base station node key, and accordingly establish a first security association between the user equipment and the base station node. The base station node obtains a second base station node key belonged to the relay node through a radio bearer transfer between the base station node and the relay node, so that the relay node and the base station node obtain a second near-end data ciphering key, a second near-end control signal ciphering key and a second near-end control signal integrity key belonged to the relay node according to the second base station node key, so as to establish a second security association between the relay node and the base station node, wherein the second base station node is generated according to a second security management key belonged to the relay node.

An exemplary embodiment of the disclosure provides a security method in a wireless communication system, which is used for providing a security association between a user equipment, a relay node, and a base station node in the wireless communication system. The user equipment performs authentication with a serving gateway in the wireless communication system through the base station node, so as to obtain a security management key belonged to the user equipment. The user equipment executes a far-end data security mode command procedure, so as to obtain a far-end data ciphering key, a far-end data integrity key and a base station node key belonged to the user equipment according to the security management key. The user equipment executes a near-end data security mode command procedure, so as to obtain a near-end data ciphering key, a near-end control signal ciphering key and a near-end control signal integrity key belonged to the user equipment according to the base station node key, and accordingly establish a first security association between the user equipment and the base station node. The relay node transparently transfers data transmitted between the user equipment and the base station node without performing an encryption/decryption operation on the data.

According to the above descriptions, exemplary embodiments of the disclosure provide a plurality of security methods for a wireless communication system having a relay node, and the security methods provide the security association between the relay node and the user equipment or between the user equipment and the base station, and the security association between the relay node and the base station node. Therefore, a security association between the user equipment and the base station node that perform data and control signal transmission with assistance of the relay node can be established. Moreover, according to a part of the above security methods, a hardware cost and design complexity of the relay node can be reduced, or high security and group security, etc. can be achieved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The disclosure provides a plurality of exemplary embodiments of security methods in a wireless communication system having a relay node, so as to resolve a problem of unknown security association between the relay node and an eNB. Some security methods of the exemplary embodiments provide a higher security than that of a conventional wireless communication system, and some other security methods provide security the same to that of the conventional communication system.

Figure 1:
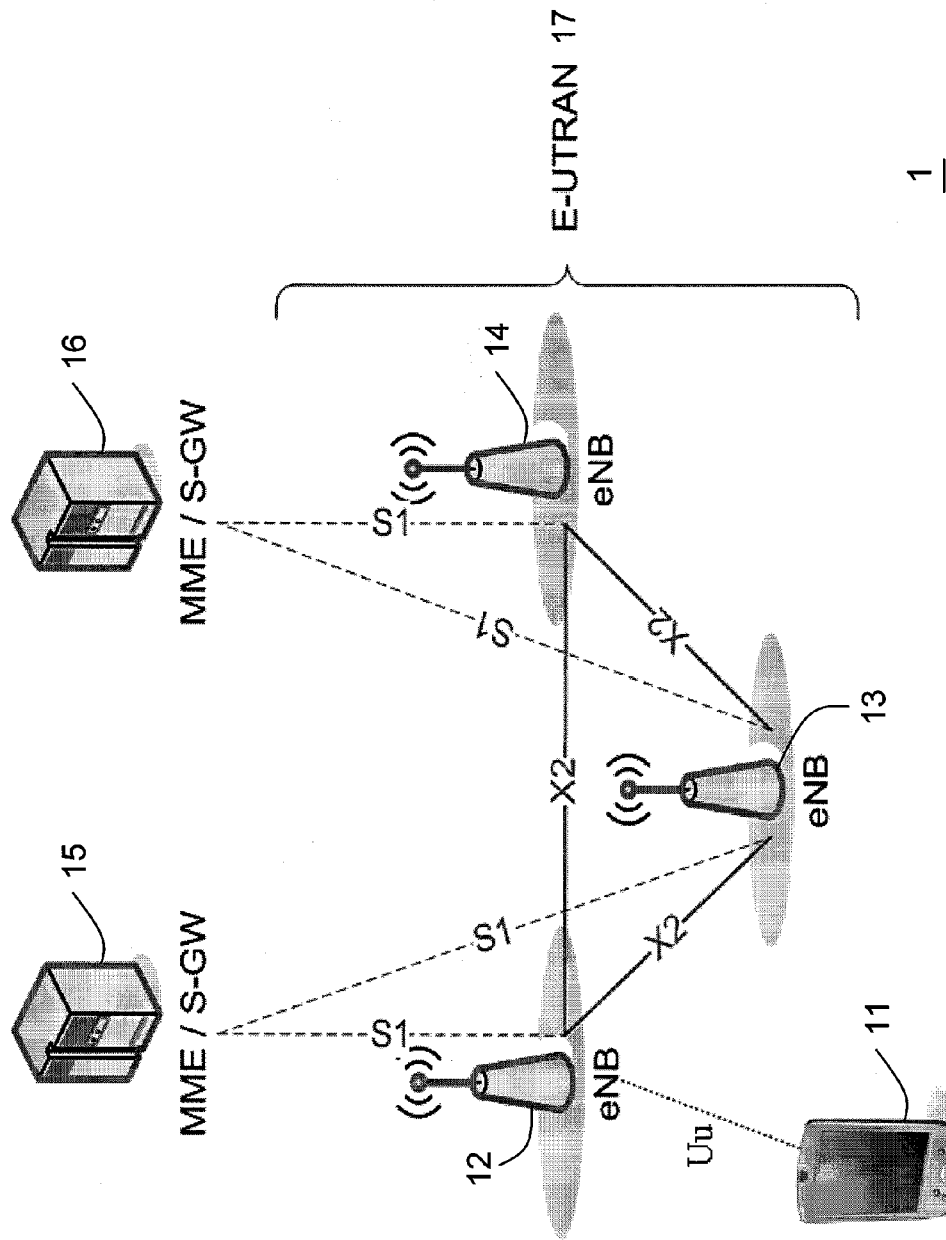
FIG. 1 is a system schematic diagram illustrating a long term evolution (LTE) system.
Figure 2:
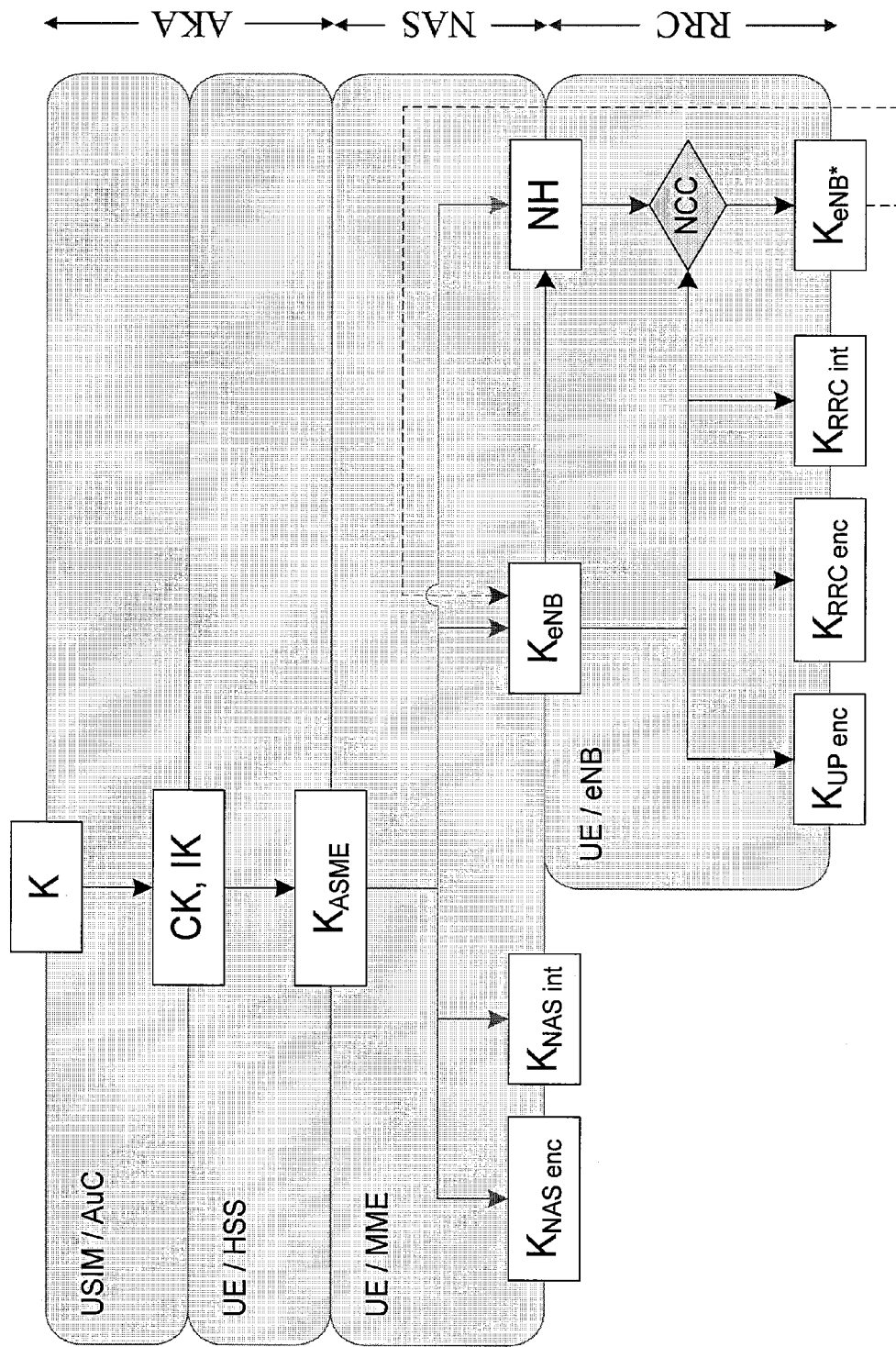
FIG. 2 is a schematic diagram illustrating a key hierarchy in an LTE system.
Figure 3:
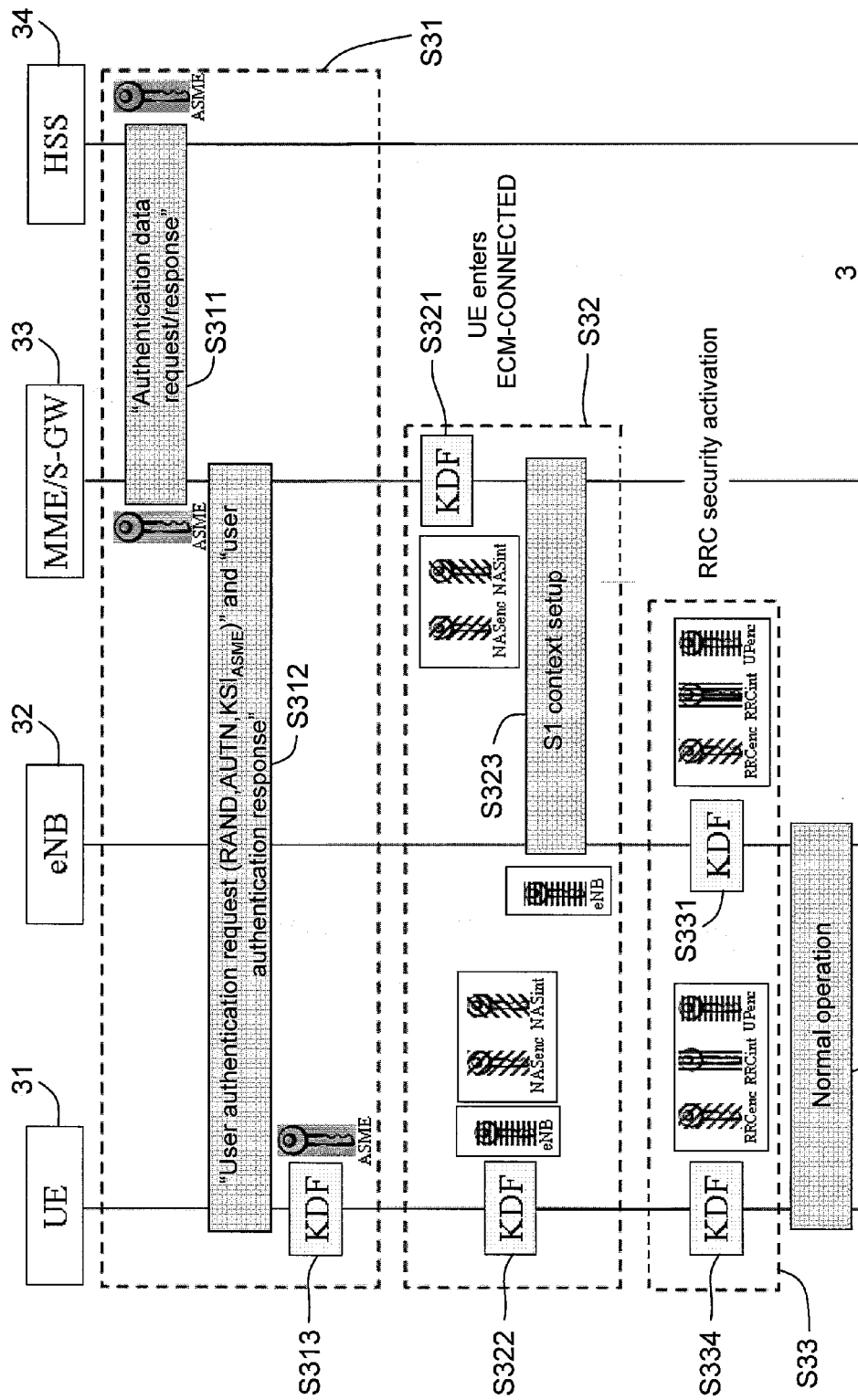
FIG. 3 is a flowchart illustrating a security method of an LTE system.
Figure 4:
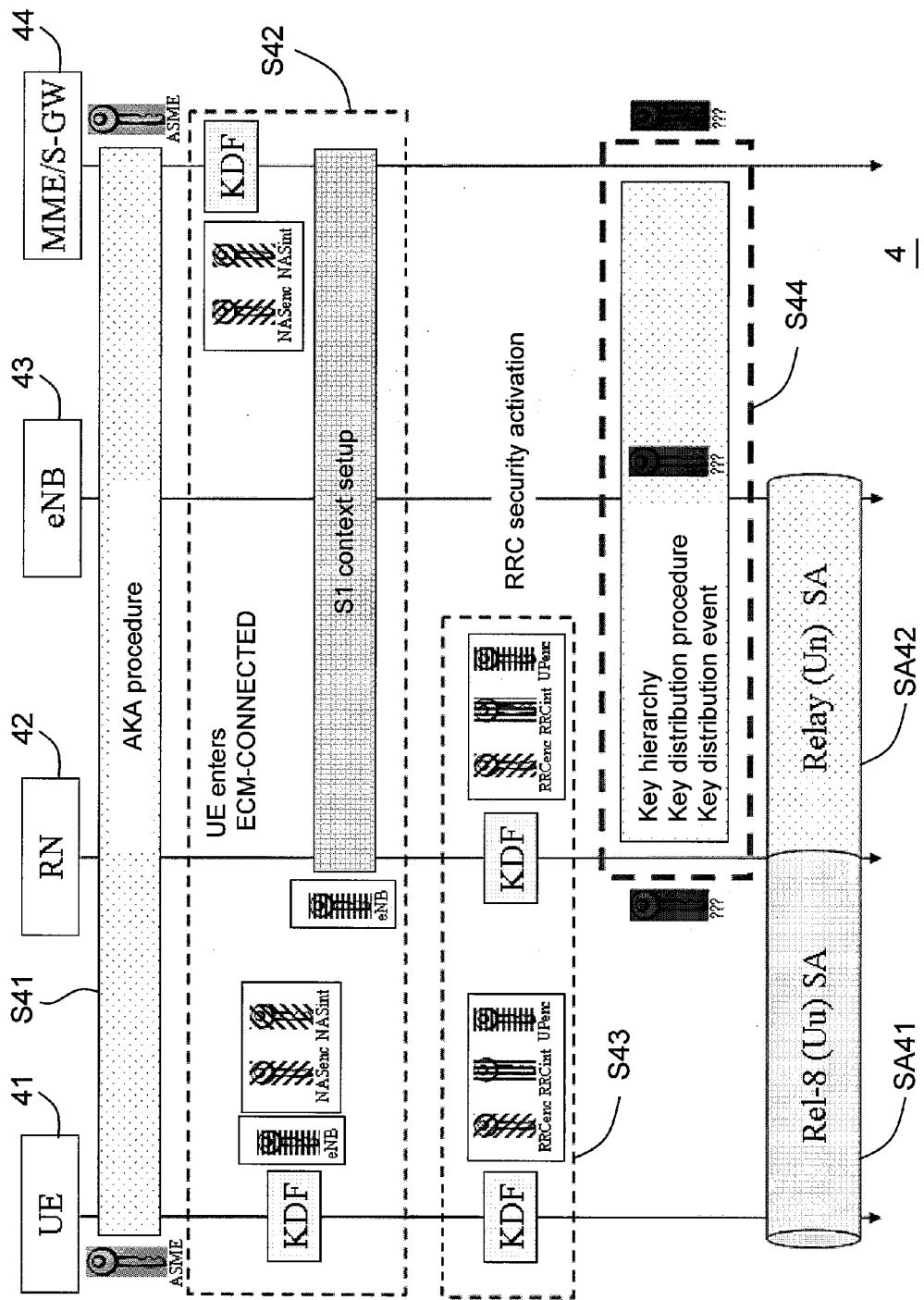
FIG. 4 is a schematic diagram illustrating a security problem between a relay node and an eNB.
Figure 5:
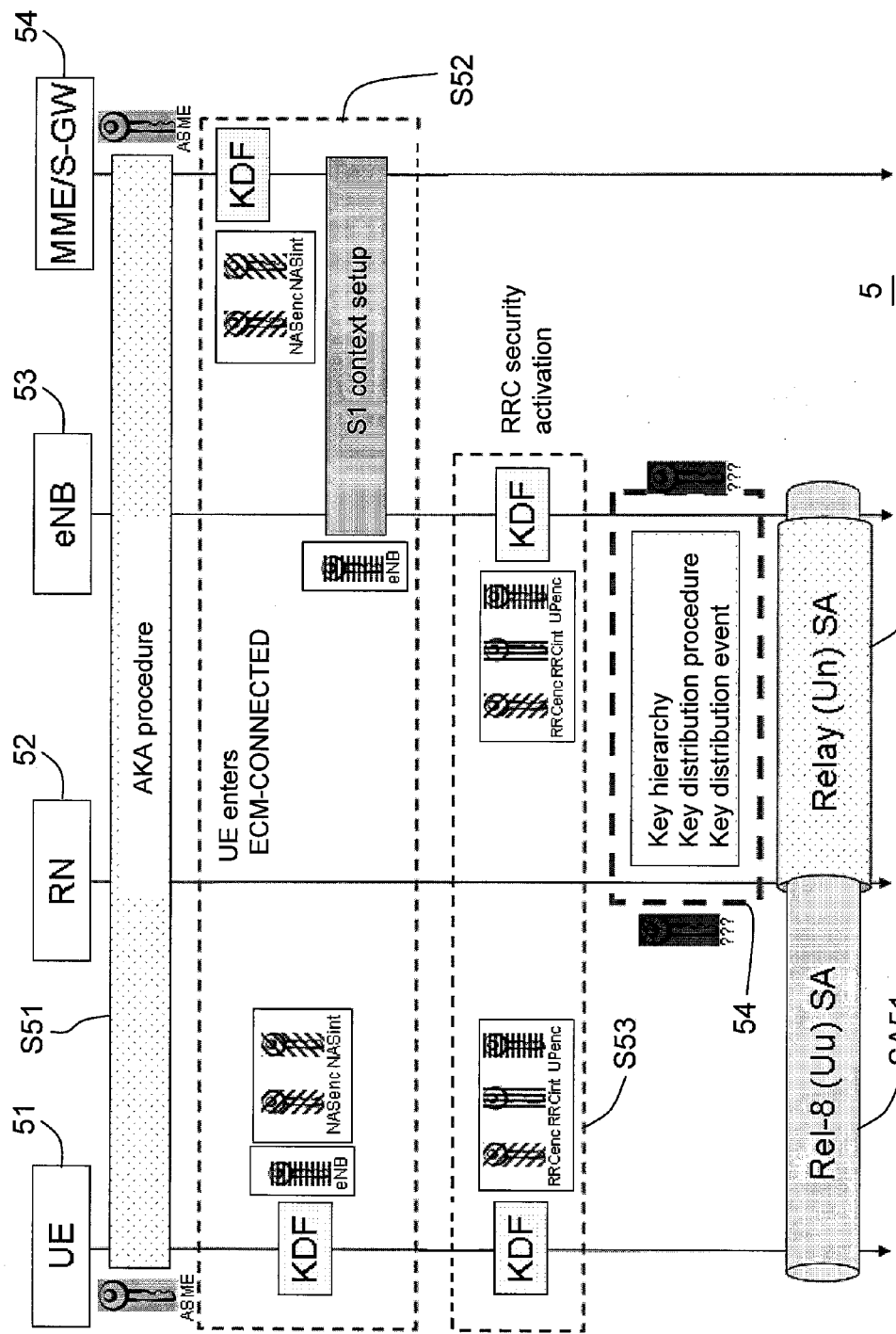
FIG. 5 is a schematic diagram illustrating another security problem between a relay node and an eNB.
Figure 6:
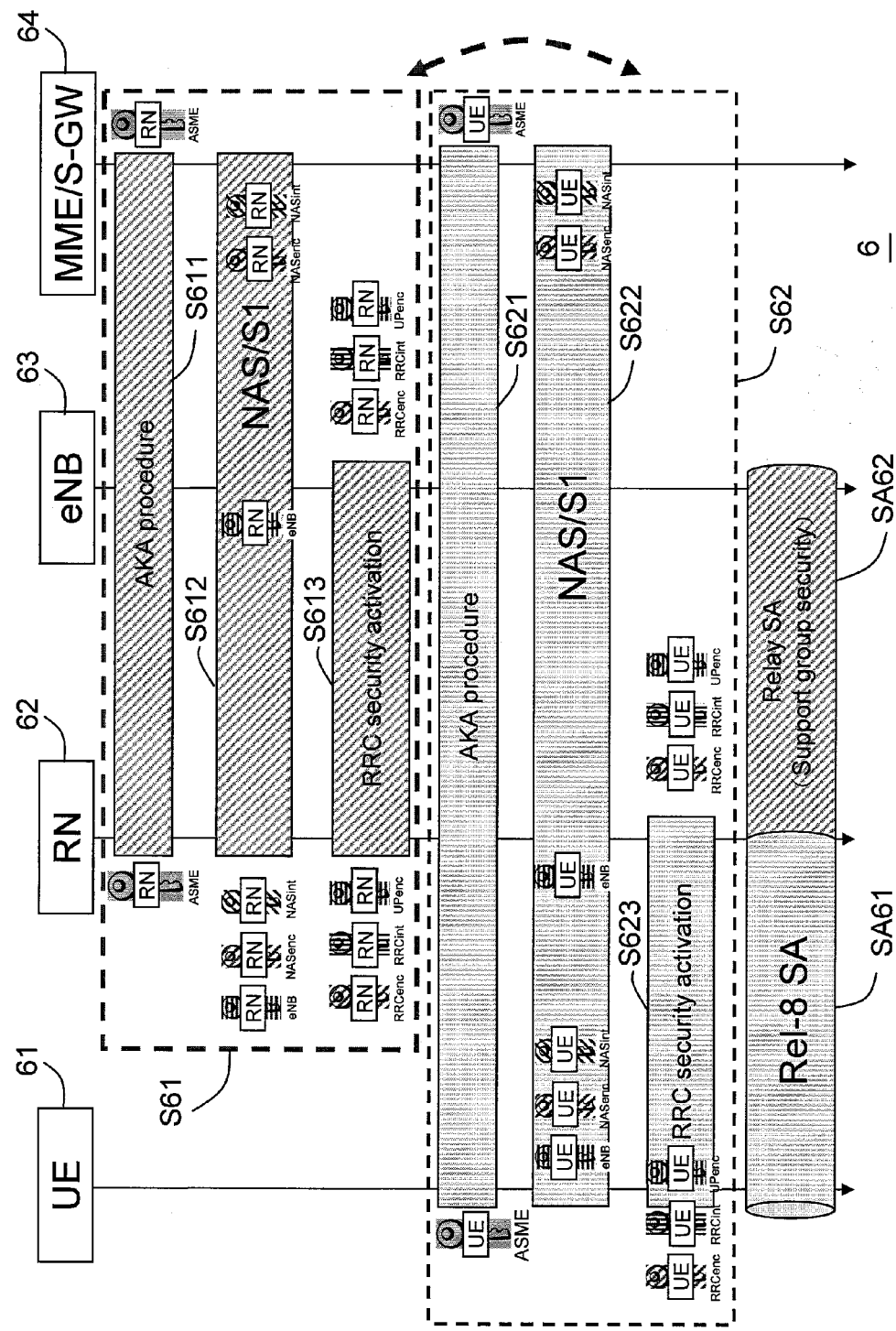
FIG. 6 is a flowchart illustrating a security method in a wireless communication system having a relay node according to an exemplary embodiment of the disclosure.

Referring to FIG. 6, FIG. 6 is a flowchart illustrating a security method in a wireless communication system having a relay node according to an exemplary embodiment of the disclosure. A long term evolution (LTE) system 6 includes a user equipment (UE) 61, a relay node (RN) 62, an eNB 63 and a mobile management entity/serving gateway (MME/S-GW) 64. In the present exemplary embodiment, the LTE system 6 regards the RN 62 as a user equipment of the eNB 63, and an S1 interface is terminated at the RN 62. In other words, the RN 62 can communicate with the MME/S-GW 64 through the S1 interface.

First, in step S61, the RN 62 and the eNB 63 establish a security association SA62. Then, after the RN 62 and the eNB 63 establish the security association SA62, a step S62 is executed. In the step S62, the RN 62 and the UE 61 establish a security association SA61.

The step S61 includes steps S611, S612 and S613. In the step S611, the RN 62 and the MME/S-GW 64 execute an authentication and key agreement (AKA) procedure through the eNB 63, so that the RN 62 and the MME/S-GW 64 obtain a security management key $K_{ASME}$ belonged to the RN 62.

In the step S612, a non-access layer (NAS) security mode command procedure is executed, so that the RN 62 can obtain an NAS ciphering key $K_{NAS\ enc}$, an NAS integrity key $K_{NAS\ int}$ and an eNB key $K_{eNB}$ belonged to the RN 62 according to the security management key $K_{ASME}$ belonged to the RN 62. The MME/S-GW 64 can also obtain the NAS ciphering key $K_{NAS\ enc}$ and the NAS integrity key $K_{NAS\ int}$ belonged to the RN 62, and the MME/S-GW 64 sets an S1 context through the S1 interface, so that the eNB 63 can obtain the eNB key $K_{eNB}$ belonged to the RN 62.

In the step S613, an access layer (AS) security mode command procedure is executed, so that a radio resource control between the eNB 63 and the RN 62 can be activated. The RN 62 and the eNB 63 can obtain a user plane ciphering key $K_{UP\ enc}$, a radio resource control ciphering key $K_{RRC\ enc}$ and a radio resource control integrity key $K_{RRC\ int}$ belonged to the RN 62 according to the eNB key $K_{eNB}$ belonged to the RN 62. In this way, establishment of the security association SA62 is completed.

The step S62 includes steps S621, S622 and S623. In the step S621, the UE 61 and the MME/S-GW 64 executes the AKA procedure through the RN 62, so that the UE 61 and the MME/S-GW 64 obtains a security management key $K_{ASME}$ the belonged to the UE 61.

In the step S622, the NAS security mode command procedure is executed, so that the UE 61 can obtain an NAS ciphering key $K_{NAS\ enc}$, an NAS integrity key $K_{NAS\ int}$ and an eNB key $K_{eNB}$ belonged to the UE 61 according to the security management key $K_{ASME}$ belonged to the UE 61. The MME/S-GW 64 can also obtain the NAS ciphering key $K_{NAS\ enc}$ and the NAS integrity key $K_{NAS\ int}$ belonged to the UE 61, and the MME/S-GW 64 sets the S1 context through the S1 interface, so that the RN 62 can obtain the eNB key $K_{eNB}$ belonged to the UE 61.

In the step S623, the AS security mode command procedure is executed, so that a radio resource control between the UE 61 and the RN 62 can be activated. The RN 62 and the UE 61 can obtain a user plane ciphering key $K_{UP\ enc}$, a radio resource control ciphering key $K_{RRC\ enc}$ and a radio resource control integrity key $K_{RRC\ int}$ belonged to the UE 61 according to the eNB key $K_{eNB}$ belonged to the UE 61. In this way, establishment of the security association SA61 is completed.

Through the security association SA61, the UE 61 and the RN 62 can use the user plane ciphering key $K_{UP\ enc}$, the radio resource control ciphering key $K_{RRC\ enc}$ and the radio resource control integrity key $K_{RRC\ int}$ belonged to the UE 61 to encrypt/decrypt data and control signals transmitted therebetween. Through the security association SA62, the eNB 63 and the RN 62 can use the user plane ciphering key $K_{UP\ enc}$, the radio resource control ciphering key $K_{RRC\ enc}$ and the radio resource control integrity key $K_{RRC\ int}$ belonged to the RN 62 to encrypt/decrypt data and control signals transmitted therebetween.

Since the security association SA61 and the security association SA62 use different user plane ciphering keys $K_{UP\ enc}$, radio resource control ciphering keys $K_{RRC\ enc}$ and radio resource control integrity keys $K_{RRC\ int}$, in the present exemplary embodiment, security of the LTE system 6 is higher than that of a conventional LTE system.

Moreover, in the present exemplary embodiment, the security association SA62 is capable of supporting group security. For example, regarding UEs belonged to a same group, the RN 62 may use the same user plane ciphering key $K_{UP\ enc}$ the radio resource control ciphering key $K_{RRC\ enc}$ and the radio resource control integrity key $K_{RRC\ int}$ to establish the same security associations SA62. In other cases, a security association mapping technique can also be used to convert and transfer the encrypted data between the security associations SA61 and SA62 or security associations of different groups.

Moreover, an executing sequence of the steps S61 and S62 of FIG. 6 is not limited by the disclosure. For example, the step S62 can be first executed, and then the step S61 is executed. Besides, under a premise that the step S611 is executed before the steps S612 and S613, and under a premise that the step S621 is executed before the steps S622 and S623, the executing sequence of the other steps can be arbitrarily adjusted.

The so-called "AKA procedure" executed in the step S611 and the step S621 is a name defined in the LTE system, which may have other names in systems defined by other standards. A purpose of the step S611 or the step S621 is to perform the authentication between the RN 62 and the MME/S-GW 64, or perform the authentication between the UE 61 and the MME/S-GW 64.

The so-called "NAS security mode command procedure" executed in the steps S612 and S622 is a name defined in the LTE system, which may have other names in systems defined by other standards. A purpose of the step S612 or the step S622 is to ensure security protection of data and control signals transmitted between the RN 62 and the MME/S-GW 64, or ensure security protection of data and control signals transmitted between the UE 61 and the MME/S-GW 64.

The "AS security mode command procedure" executed in the steps S613 and S623 is a name defined in the LTE system, which may have other names in systems defined by other standards. A purpose of the step S613 or the step S623 is to ensure security protection of data and control signals transmitted between the RN 62 and the eNB 63, or ensure security protection of data and control signals transmitted between the UE 61 and the RN 62.

In the disclosure, the AKA procedure can be referred to as a client authentication procedure. Through the client authentication procedure, the UE 61 or the RN 62 used as clients can be authenticated by the far-end MME/S-GW 64. Moreover, in the disclosure, the NAS security mode command procedure can be referred to as a far-end data security mode command procedure, which is used for providing security protection of data and control signals transmitted to or transmitted from the MME/S-GW 64. In the disclosure, the AS security mode command procedure can be referred to as a near-end data security mode command procedure, which is used for providing security protection of data and control signals transmitted between the RN 62 and the eNB 63, or between the UE 61 and the RN 62 or between the UE 61 and the eNB 63.

According to the above definitions, the NAS ciphering key $K_{NAS\ enc}$ and the NAS integrity key $K_{NAS\ int}$ can be respectively referred to as a far-end data ciphering key and a far-end data integrity key. The user plane ciphering key $K_{UP\ enc}$, the radio resource control ciphering key $K_{RRC\ enc}$ and the radio resource control integrity key $K_{RRC\ int}$ can be respectively referred to as a near-end data ciphering key, a near-end control signal ciphering key and a near-end control signal integrity key. In the disclosure, the eNB key $K_{eNB}$ can be referred to as a base station key.

Figure 7:
FIG. 7 is a flowchart illustrating an authentication and key agreement (AKA) procedure according to an exemplary embodiment of the disclosure.

Then, referring to FIG. 7, FIG. 7 is a flowchart illustrating the AKA procedure according to an exemplary embodiment of the disclosure. The AKA procedure of the steps S611 and S621 is shown by contents of FIG. 7. The contents of FIG. 7 are complied with contets of 3GPP. A mobile equipment (ME), a universal subscriber identity module (USIM) or a relay node regarded as a user equipment of an eNB may execute and complete the AKA procedure together with the MME.

First, in step S9500, the MME transmits "user authentication request (RAND, AUTN, $KSI_{ASME}$)" to the ME, the USIM or the relay node regarded as the user equipment of the eNB, wherein "user authentication request (RAND, AUTN, $KSI_{ASME}$)" represents a user authentication request carrying information of RAND, AUTN, $KSI_{ASME}$, etc., wherein RAND represents a random number, AUTN represents an authentication number, and $KSI_{ASME}$ represents a key group identification corresponding to the security management key $K_{ASME}$.

Then, a step S9501 or the step S9502 is executed. If the ME, the USIM or the relay node regarded as the user equipment of the eNB accepts the user authentication request from the MME, the step S9501 is executed. Conversely, if the ME, the USIM or the relay node regarded as the user equipment of the eNB rejects the user authentication request, the step S9502 is executed.

In the step S9501, the ME, the USIM or the relay node regarded as the user equipment of the eNB transmits "user authentication response (RES)" to the MME, wherein "user authentication response (RES)" represents a user authentication response carrying RES information, wherein "RES" represents response, which is defined by 3GPP. Otherwise, in the step S9502, the ME, the USIM or the relay node regarded as the user equipment of the eNB transmits "user authentication reeject (CAUSE)" to the MME, wherein "user authentication reject (CAUSE)" represents a user authentication reject message carrying CAUSE information, wherein CAUSE represents a code "CAUSE" used for notifying an error, which is defined by 3GPP.

Figure 8:
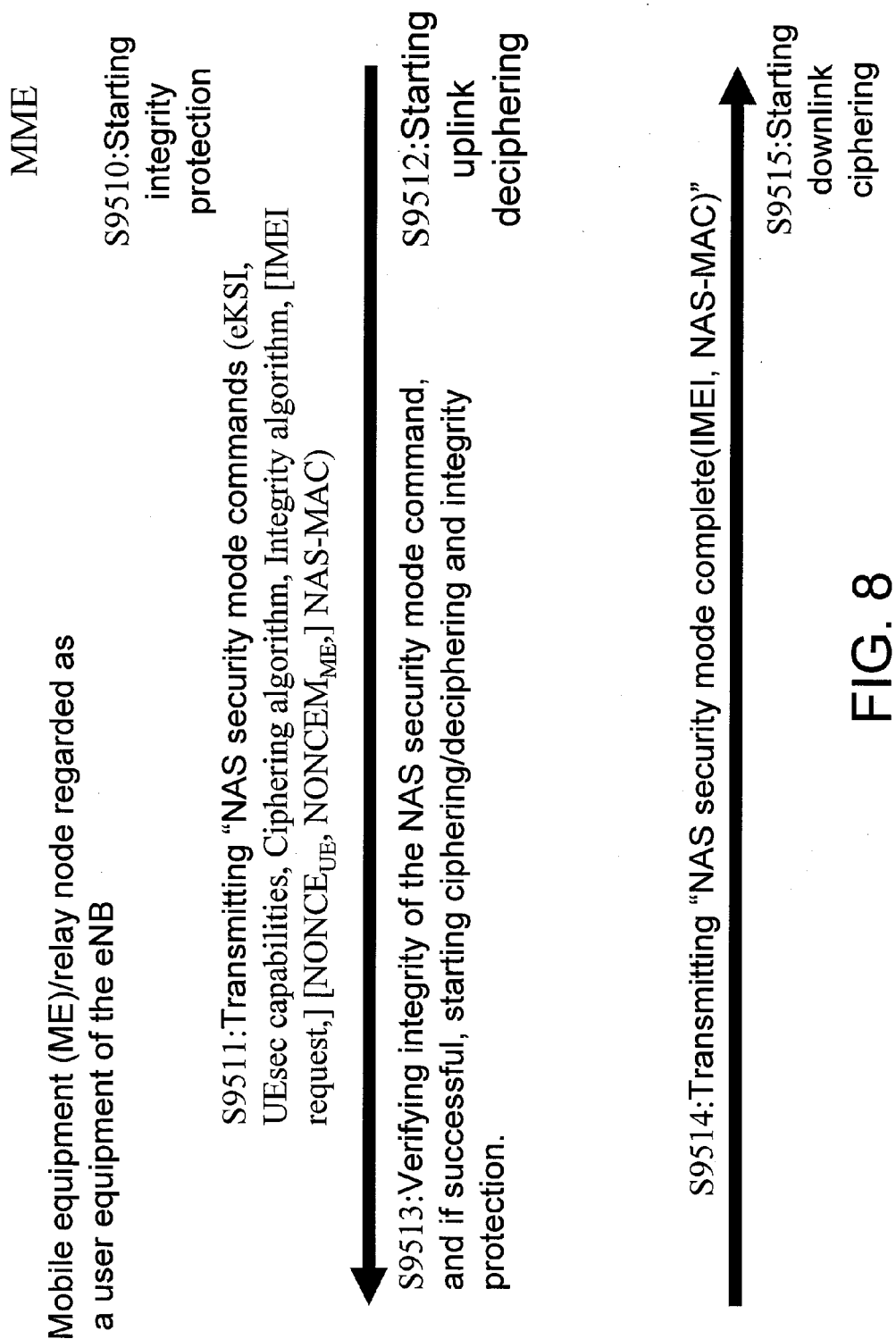
FIG. 8 is a flowchart illustrating a non-access layer (NAS) security mode command procedure according to an exemplary embodiment of the disclosure.

Then, referring to FIG. 8, FIG. 8 is a flowchart illustrating the NAS security mode command procedure according to an exemplary embodiment of the disclosure. The NAS security mode command procedure of the step S612 and the step S622 is shown by contents of FIG. 8. The contents of FIG. 8 is complied with contents of 3GPP. The ME or the or the relay node regarded as the user equipment of the eNB may execute and complete the NAS security mode command procedure together with the MME.

First, in step S9510, the MME starts integrity protection. Then, in step S9511, the MME transmits "NAS security mode command (eKSI, UEsec capabilities, Ciphering algorithm, Integrity algorithm, [IMEI request], [NONCE$_{UE}$, NONCE$_{MME}$], NAS-MAC)" to the ME or the relay node regarded as the user equipment of the eNB, wherein "NAS security mode command (eKSI, UEsec capabilities, Ciphering algorithm, Integrity algorithm, [IMEI request], [NONCE$_{UE}$, NONCE$_{MME}$], NAS-MAC)" represents an NAS security mode command carrying information of eKSI, UEsec capabilities, Ciphering algorithm, Integrity algorithm, [IMEI request], [NONCE$_{UE}$, NONCE$_{MME}$] and NAS-MAC, etc., and eKSI, UEsec capabilities, Ciphering algorithm, Integrity algorithm, [IMEI request], [NONCE$_{UE}$, NONCE$_{MME}$] and NAS-MAC are defined by 3GPP.

Then, in step S9512, the MME starts uplink deciphering, such that the received uplink data and control signals of the MME are deciphered. In step S9513, the ME or the relay node regarded as the user equipment of the eNB verifies integrity of the NAS security mode command. If the integrity of the NAS security mode command is successfully verified, the ME or the relay node regarded as the user equipment of the eNB starts ciphering/deciphering and integrity protection, and in step S9514, the ME or the relay node regarded as the user equipment of the eNB transmits "NAS security mode complete ([IMEI], NAS-MAC)" to the MME, wherein "NAS security mode completion ([IMEI], NAS-MAC)" presents an NAS security mode complete message carrying information of [IMEI] and NAS-MAC, etc., and [IMEI] and NAS-MAC are defined by 3GPP. Then, in step S9515, after the MME receives "NAS security mode complete ([IMEI], NAS-MAC)", the MME starts downlink ciphering, such that the downlink data and control signals transmitted from the MME to the ME or the relay node regarded as the user equipment of the eNB are ciphered.

Figure 9:
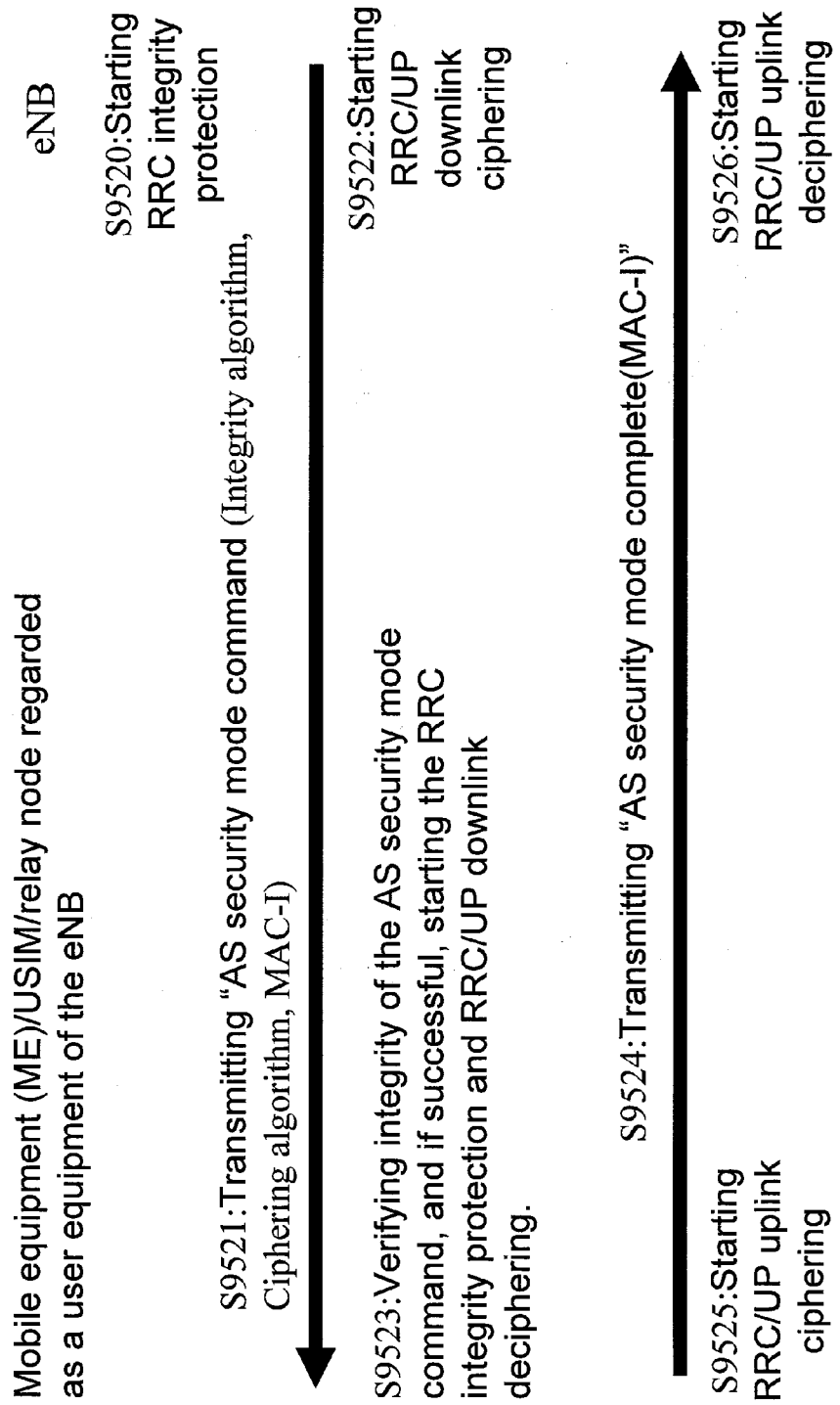
FIG. 9 is a flowchart illustrating an access layer (AS) security mode command procedure according to an exemplary embodiment of the disclosure.

Then, referring to FIG. 9, FIG. 9 is a flowchart illustrating the AS security mode command procedure according to an exemplary embodiment of the disclosure. The AS security mode command procedure of the step S613 and the step S623 is shown by contents of FIG. 9. The contents of FIG. 9 is complied with contents of 3GPP. The ME, the USIM, or the relay node regarded as the user equipment of the eNB may execute and complete the AS security mode command procedure together with the eNB.

First, in step S9520, the eNB starts radio resource control integrity protection. Then, in step S9521, the eNB transmits "AS security mode command (Integrity algorithm, Ciphering algorithm, MAC-I)" to the ME, the USIM or the relay node regarded as the user equipment of the eNB, wherein "AS security mode command (Integrity algorithm, Ciphering algorithm, MAC-I)" represents an AS security mode command carrying information of Integrity algorithm, Ciphering algorithm and MAC-I etc., and Integrity algorithm, Ciphering algorithm and MAC-I are defined by 3GPP.

Then, in step S9522, the eNB starts radio resource control/ user plane (UP) downlink ciphering, such that the downlink data and control signals to be transmitted to the ME, the USIM or the relay node regarded as the user equipment of the eNB from the eNB are ciphered. In step S9523, the ME, the USIM or the relay node regarded as the user equipment of the eNB verifies integrity of the AS security mode command. If the integrity of the AS security mode command is successfully verified, the ME, the USIM or the relay node regarded as the user equipment of the eNB starts radio resource control integrity protection and radio resource control/user plane downlink deciphering, such that the downlink data and control signals transmitted from the eNB to the ME USIM or the relay node regarded as the user equipment of the eNB are deciphered.

In step S9524, the ME, the USIM or the relay node regarded as the user equipment of the eNB transmits "AS security mode complete (MAC-I)" to the eNB, wherein "AS security mode completion (MAC-I)" presents an AS security mode complete message carrying information of MAC-I, and MAC-I is 3GPP. Then, in step S9525, after transmitting "AS security mode complete (MAC-I)", the ME, the USIM or the relay node regarded as the user equipment of the eNB starts radio resource control/user plane uplink ciphering, such that uplink data and control signals to be transmitted to the eNB are ciphered. In the step S9526, after receiving "AS security mode complete (MAC-I)", the eNB starts radio resource control/user plane uplink deciphering, such that the received uplink data and control signals to eNB are deciphered.

Figure 10:
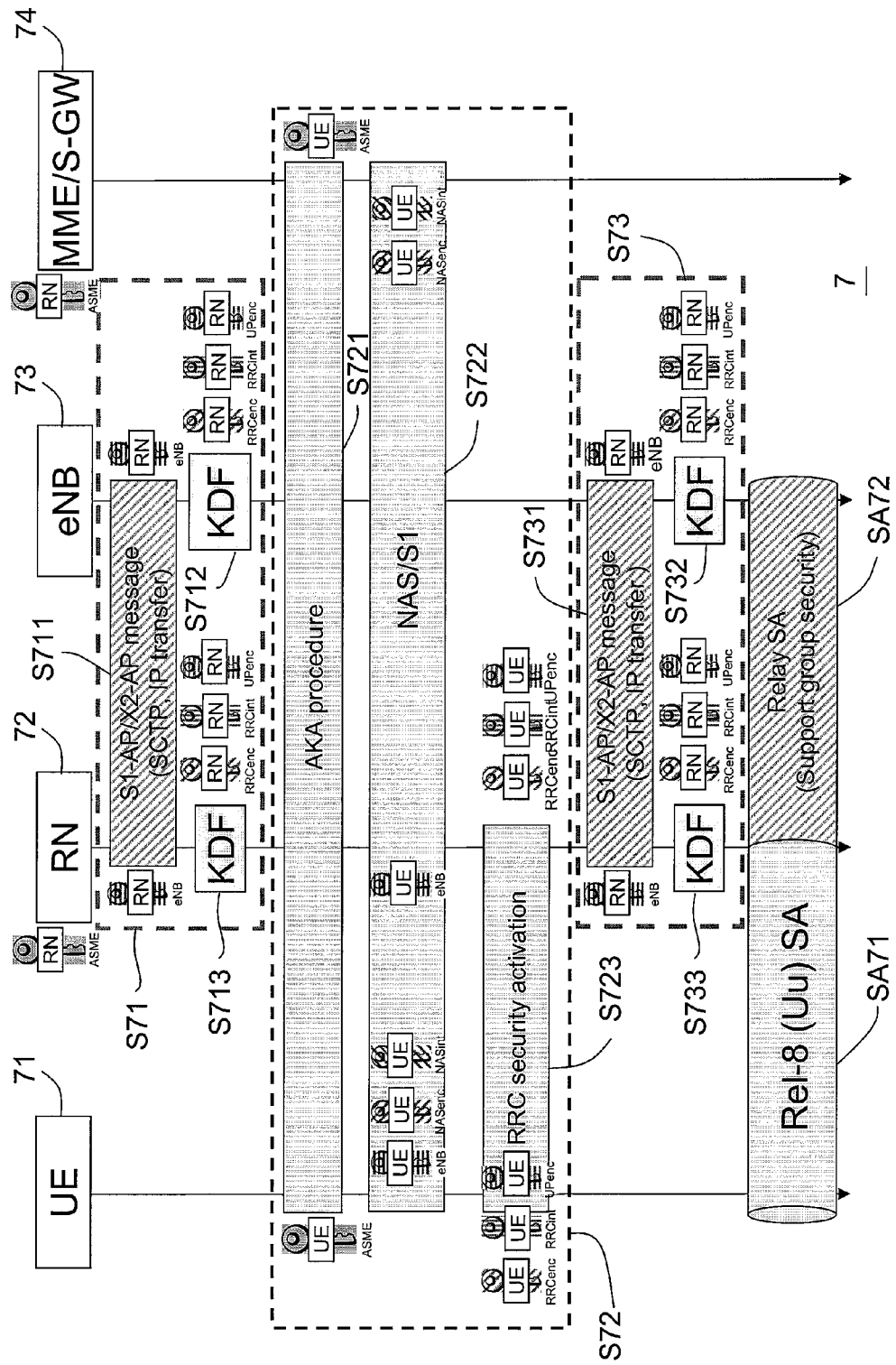
FIG. 10 is a flowchart illustrating a security method in a wireless communication system having a relay node according to another exemplary embodiment of the disclosure.

Referring to FIG. 10, FIG. 10 is a flowchart illustrating a security method in a wireless communication system having a relay node according to another exemplary embodiment of the disclosure. An LTE system 7 includes a UE 71, a RN 72, an eNB 73 and an MME/S-GW 74. In the present exemplary embodiment, the LTE system 7 regards the RN 72 as an eNB, and the S1 interface is terminated at the RN 72. In other words, the RN 72 can communicate with the MME/S-GW 74 through the S1 interface.

The method of FIG. 10 includes steps S71 and S72, or includes steps S72 and S73. In other words, two possible security methods are simultaneously illustrated in FIG. 10, wherein the steps S71 and S72 represent one of the security methods that the RN 72 actively provides a security association SA72, and the steps S72 and S73 represent another one of the security methods that the RN 72 passively provides the security association SA72.

The step S72 is the same to the step S62 of FIG. 6, and the steps S721-S723 included in the step S72 are also the same to the steps S621-S623 included in the step S62, so that detailed descriptions thereof are not repeated. After execution of the step S72 is completed, the RN 72 and the UE 71 can establish a security association SA71.

In the step S71, after the RN 72 has been authenticated with the MME/S-GW 74 through the eNB 73, the RN 72 and the eNB 73 can obtain an eNB key K$_{eNB}$ belonged to the RN 72, and obtain a user plane ciphering key $K_{UP\,enc}$, a radio resource control ciphering key $K_{RRC\,enc}$ and a radio resource control integrity key $K_{RRC\,int}$ belonged to the RN 72 according to the eNB key $K_{eNB}$ belonged to the RN 72. Therefore, the security association SA72 between the RN 72 and the eNB 73 can be established.

The step S71 is executed before the step S72. Namely, before the security association SA71 is established, the security association SA72 is actively established, so as to facilitate data and control signal transmission between the RN 72 and the eNB 73. Accordingly, the steps S71 and S72 are referred to as a security method that the RN 72 actively provides the security association SA72.

The step S71 includes steps S711, S712 and S713. In the step S711, after the RN 72 has been authenticated with the MME/S-GW 74 through the eNB 73, the RN 72 may transmit an S1-AP message to the eNB 73 through the S1 interface, so that the RN 72 and the eNB 73 can obtain the eNB key $K_{eNB}$ belonged to the RN 72 according to the security management key $K_{ASME}$ belonged to the RN 72. Alternatively, the RN 72 may transmit an X2-AP message to the eNB 73 through an X2 interface, so that the RN 72 and the eNB 73 can obtain the eNB key $K_{eNB}$ belonged to the RN 72 according to the security management key $K_{ASME}$ belonged to the RN 72. Definitions of the S1-AP message and the X2-AP message can be referred to 3GPP, so that detailed descriptions thereof are not repeated. Besides, the S1-AP message or the X2-AP message may be transmitted through stream control transmission protocol (SCTP) or Internet protocol (IP) transfer.

In the step S712, the RN 72 executes the KDF, so as to obtain the user plane ciphering key $K_{UP\,enc}$, the radio resource control ciphering key $K_{RRC\,enc}$ and the radio resource control integrity key $K_{RRC\,int}$ belonged to the RN 72 according to the eNB key $K_{eNB}$ belonged to the RN 72.

In the step S713, the eNB 73 executes the KDF, so as to obtain the user plane ciphering key $K_{UP\,enc}$, the radio resource control ciphering key $K_{RRC\,enc}$ and the radio resource control integrity key $K_{RRC\,int}$ belonged to the RN 72 according to the eNB key $K_{eNB}$ belonged to the RN 72.

An executing sequence of the steps S713 and S712 is not limited by the disclosure. Moreover, under a premise that the step S711 is executed before the steps S713 and S712, the executing sequence of the steps S712 and S713 of FIG. 10 can be arbitrarily arranged.

The step S73 is executed after execution of the step S72 is completed. Namely, after the security association SA71 is established, the security association SA72 is passively established, so as to facilitate data and control signal transmission of the RN 72 and the eNB 73. Accordingly, the steps S72 and S73 are referred to as a security method that the RN 72 passively provides the security association SA72.

The step S73 is the same to the step S71, and steps S731-S733 included in the step S73 are also the same to the steps S711-S713 included in the step S71, so that detailed descriptions thereof are not repeated. It should be notice that a executing sequence of the step S732 and the step S733 is not limited. Besides, in the exemplary embodiment of FIG. 10, the security association SA72 may also support group security.

Moreover, it should be noticed that the S1 interface, the X2 interface, the S1-AP message and the X2-AP message in the step S711 and the step S731 are terms used in allusion to the LTE technique. In different standards, the terms can be different. Actually, the S1 interface and the X2 interface can be any transmission interfaces, and the S1-AP message and the X2-AP message can be transmission control messages of any transmission interface.

Figure 11:
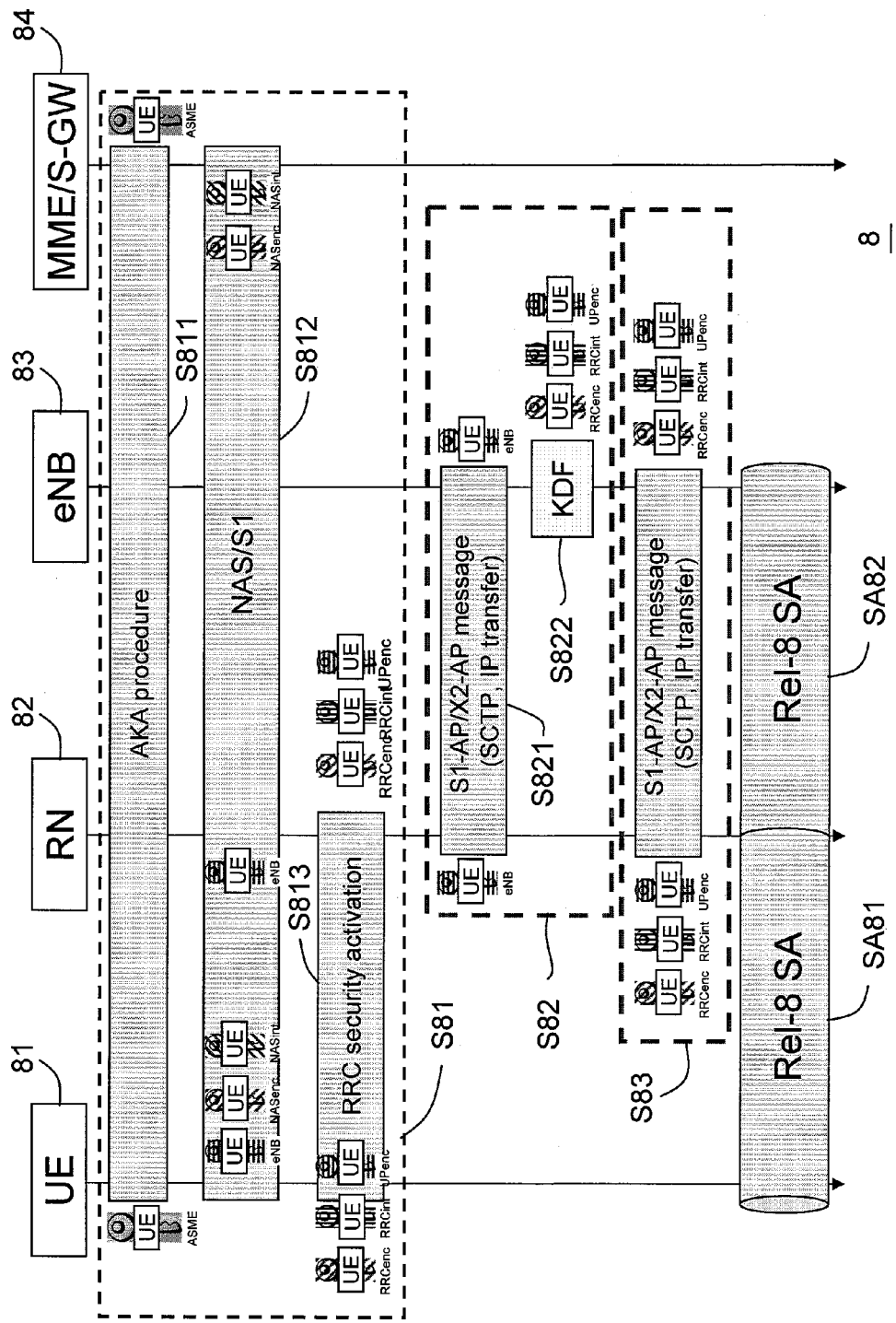
FIG. 11 is a flowchart illustrating a security method in a wireless communication system having a relay node according to another exemplary embodiment of the disclosure.

Referring to FIG. 11, FIG. 11 is a flowchart illustrating a security method in a wireless communication system having a relay node according to another exemplary embodiment of the disclosure. An LTE system 8 includes a UE 81, a RN 82, an eNB 83 and an MME/S-GW 84. In the present exemplary embodiment, the LTE system 8 regards the RN 82 as an eNB, and the S1 interface is terminated at the RN 82. In other words, the RN 82 can communicate with the MME/S-GW 84 through the S1 interface.

The method of FIG. 11 includes steps S81 and S82, or includes steps S81 and S83. In other words, two possible security methods are simultaneously illustrated in FIG. 11, wherein the steps S81 and S82 represent one of the security methods, and the steps 81 and 83 represent another one of the security methods. In the present exemplary embodiment, the step S82 or the step S83 is executed after execution of the step S81 is completed.

The step S81 is the same to the step S62 of FIG. 6, and the steps S811-S813 included in the step S81 are also the same to the steps S621-S623 included in the step S62, so that detailed descriptions thereof are not repeated. After execution of the step S81 is completed, the RN 82 and the UE 81 can establish a security association SA81.

In the step S82, after the RN 82 is authenticated with the MME/S-GW 84 through the eNB 83, the eNB 83 can obtain an eNB key $K_{eNB}$ belonged to the UE 81, and obtain a user plane ciphering key $K_{UP\,enc}$, a radio resource control ciphering key $K_{RRC\,enc}$ and a radio resource control integrity key $K_{RRC\,int}$ belonged to the UE 81 according to the eNB key $K_{eNB}$ belonged to the UE 81. Therefore, a security association SA82 between the RN 82 and the eNB 83 can be established.

The step S82 includes steps S821 and S822. In the step S821, after the RN 82 is authenticated with the MME/S-GW 84 through the eNB 83, the RN 82 may transmit the S1-AP message to the eNB 83 through the S1 interface, so that the eNB 83 can obtain the eNB key $K_{eNB}$ belonged to the UE 81. Alternatively, the RN 82 may transmit the X2-AP message to the eNB 83 through the X2 interface, so that the eNB 83 can obtain the eNB key $K_{eNB}$ belonged to the UE 81.

In the step S822, the eNB 83 executes the KDF, so as to obtain the user plane ciphering key $K_{UP\,enc}$, the radio resource control ciphering key $K_{RRC\,enc}$ and the radio resource control integrity key $K_{RRC\,int}$ belonged to the UE 81 according to the eNB key $K_{eNB}$ belonged to the UE 81.

To improve a security of the LTE system 8, the security method including the steps S81 and S83 is provided. Compared to the security method including the steps S81 and 82, in the security method including the steps S81 and S83, the RN 82 is unnecessary to transmit the eNB key $K_{eNB}$ belonged to the UE 81 to the eNB 83.

In the step S83, after the RN 82 is authenticated with the MME/S-GW 84 through the eNB 83, the RN 82 may transmit the S1-AP message to the eNB 83 through the S1 interface, so that the eNB 83 can obtain the user plane ciphering key $K_{UP\,enc}$, the radio resource control ciphering key $K_{RRC\,enc}$ and the radio resource control integrity key $K_{RRC\,int}$ belonged to the UE 81. Alternatively, the RN 82 may transmit the X2-AP message to the eNB 83 through the X2 interface, so that the eNB 83 can obtain the user plane ciphering key $K_{UP\,enc}$, the radio resource control ciphering key $K_{RRC\,enc}$ and the radio resource control integrity key $K_{RRC\,int}$ belonged to the UE 81.

The user plane ciphering key $K_{UP\,enc}$ the radio resource control ciphering key $K_{RRC\,enc}$ and the radio resource control integrity key $K_{RRC\,int}$ used by the security association SA81 established between the UE 81 and the RN 82 are the same to the user plane ciphering key $K_{UP\,enc}$, the radio resource control ciphering key $K_{RRC\,enc}$ and the radio resource control integrity key $K_{RRC\ int}$ used by the security association SA82 established between the RN 82 and the eNB 83. Therefore, when one of the security associations SA81 and SA82 is updated, another security association could be simultaneously updated.

Figure 12:
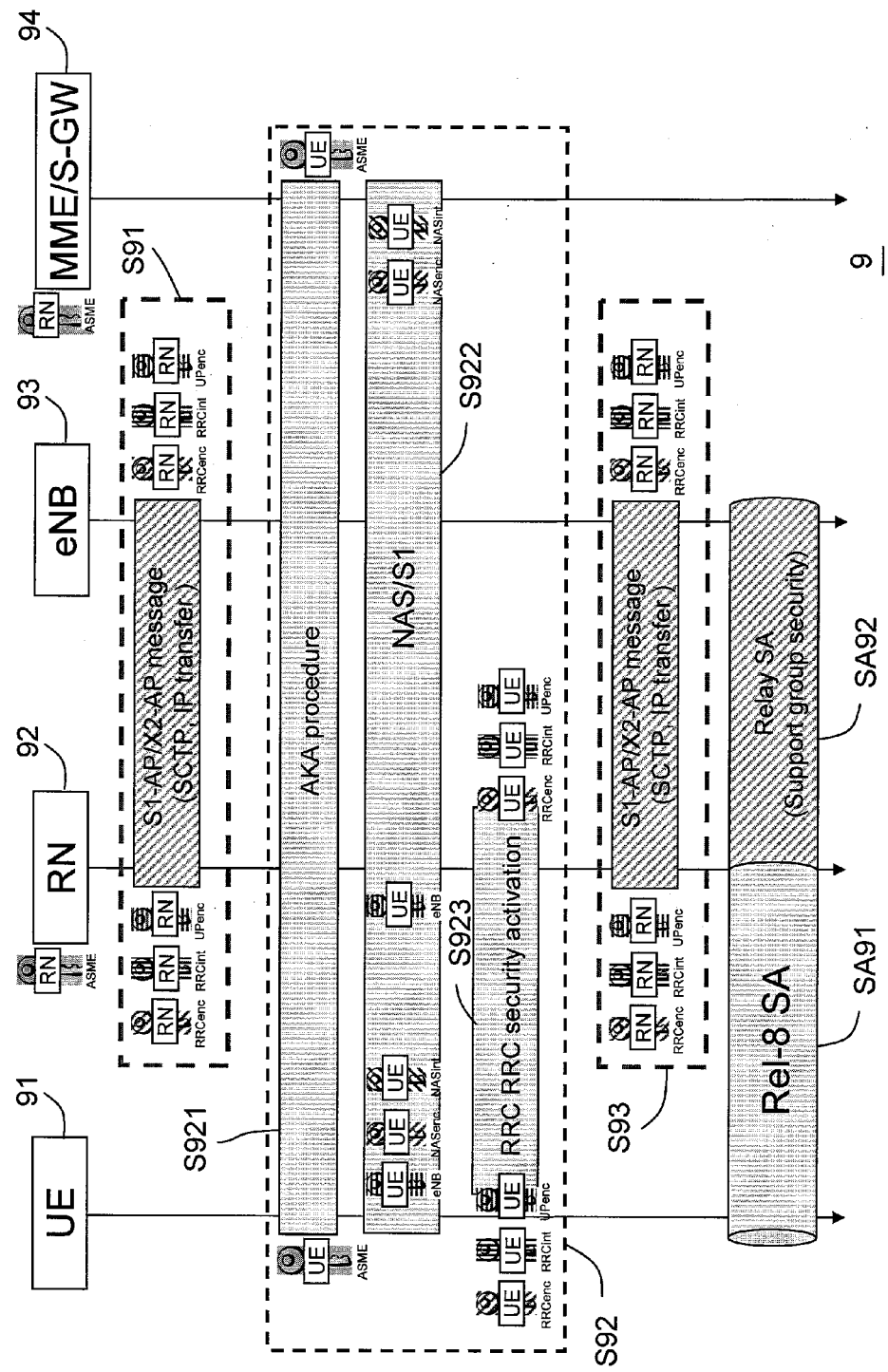
FIG. 12 is a flowchart illustrating a security method in a wireless communication system having a relay node according to another exemplary embodiment of the disclosure.

Referring to FIG. 12, FIG. 12 is a flowchart illustrating a security method in a wireless communication system having a relay node according to another exemplary embodiment of the disclosure. An LTE system 9 includes a UE 91, a RN 92, an eNB 93 and an MME/S-GW 94. In the present exemplary embodiment, the LTE system 9 regards the RN 92 as an eNB, and the S1 interface is terminated at the RN 92. In other words, the RN 92 can communicate with the MME/S-GW 94 through the S1 interface.

The method of FIG. 12 includes steps S91 and S92, or includes steps S92 and S93. In other words, two possible security methods are simultaneously illustrated in FIG. 12, wherein the steps S91 and S92 represent one of the security methods that the RN 92 actively provides a security association SA92, and the steps 92 and 93 represent another one of the security methods that the RN 92 passively provides the security association SA92.

The step S92 is the same to the step S62 of FIG. 6, and the steps S921-S923 included in the step S91 are also the same to the steps S621-S623 included in the step S62, so that detailed descriptions thereof are not repeated. After execution of the step S92 is completed, the RN 92 and the UE 91 can establish a security association SA91.

In the step S91, after the RN 92 is authenticated with the MME/S-GW 94 through the eNB 93, the RN 92 may transmit the S1-AP message to the eNB 93 through the S1 interface, so that the eNB 93 can obtain a user plane ciphering key $K_{UP\ enc}$, a radio resource control ciphering key $K_{RRC\ enc}$ and a radio resource control integrity key $K_{RRC\ int}$ belonged to the RN92. Alternatively, the RN 92 may transmit the X2-AP message to the eNB 93 through the X2 interface, so that the eNB 93 can obtain the user plane ciphering key $K_{UP\ enc}$, the radio resource control ciphering key $K_{RRC\ enc}$ and the radio resource control integrity key $K_{RRC\ int}$ belonged to the RN 92.

The step S93 is the same to the step S91, so that a detail description thereof is not repeated. In the exemplary embodiment of FIG. 12, the security association SA92 can also support group security. Compared to the LTE system 7 of FIG. 10, the LTE system 9 of FIG. 12 has higher security since the RN 92 of FIG. 12 does not transfer the eNB key $K_{eNB}$ belonged to the RN 92 to the eNB 93.

Figure 13:
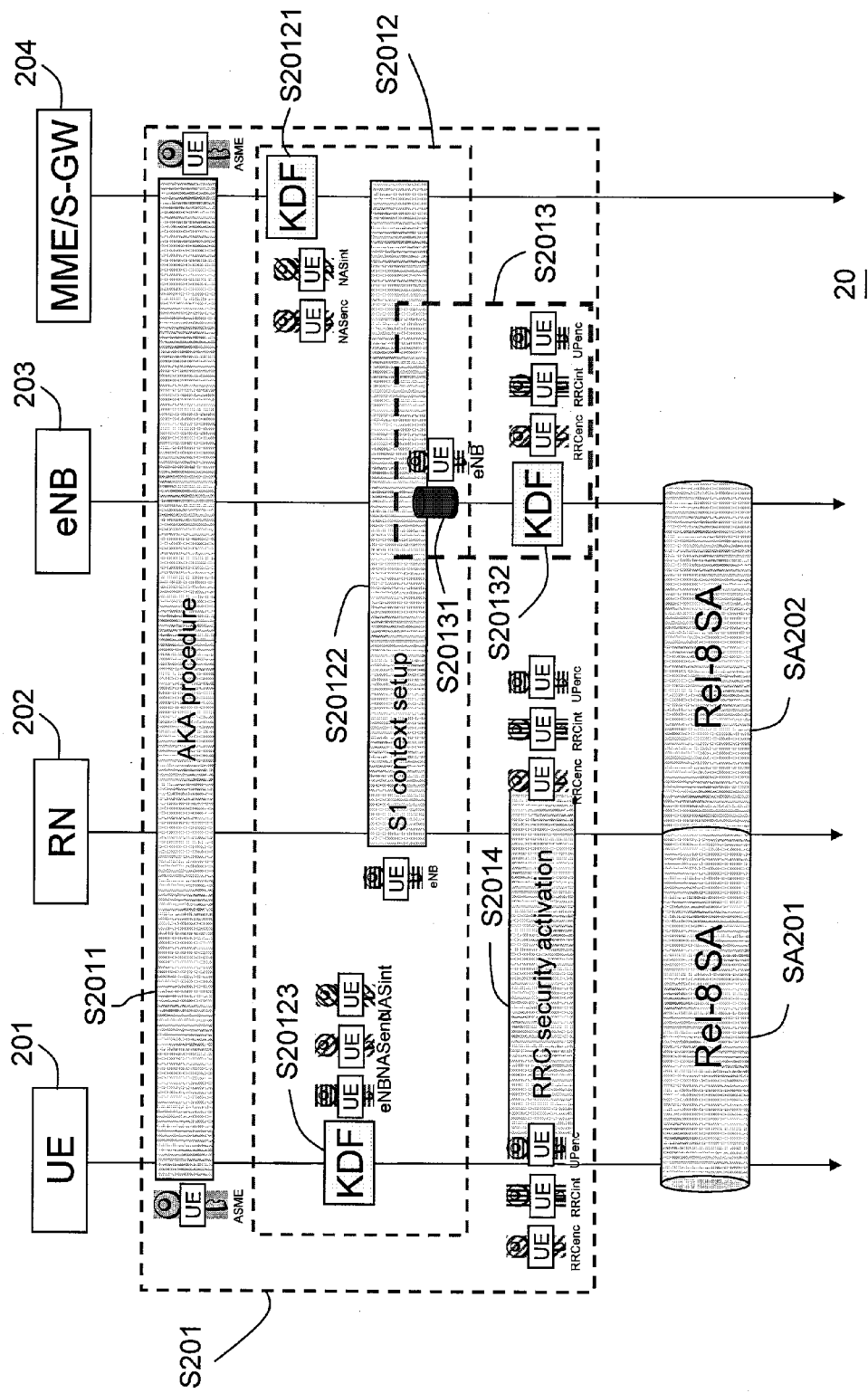
FIG. 13 is a flowchart illustrating a security method in a wireless communication system having a relay node according to another exemplary embodiment of the disclosure.

Referring to FIG. 13, FIG. 13 is a flowchart illustrating a security method in a wireless communication system having a relay node according to another exemplary embodiment of the disclosure. An LTE system 20 includes a UE 201, a RN 202, an eNB 203 and an MME/S-GW 204. In the present exemplary embodiment, the LTE system 20 regards the RN 202 as an eNB, and the S1 interface is terminated at the RN 202. In other words, the RN 202 can communicate with the MME/S-GW 204 through the S1 interface.

In the exemplary embodiment of FIG. 13, a step S201 is first executed, so as to establish a security association SA 201 between the RN 202 an the UE 201. While the security association SA 201 between the RN 202 an the UE 201 is established, an eNB key $K_{eNB}$ of the UE 201 is duplicated to the eNB 203, so as to establish a security association SA 202 between the RN 202 an the eNB 203.

The step S201 includes steps S2011, S2012, S2013 and S2014. In the step S2011, an AKA procedure is executed, so that the UE 201 and the MME/S-GW 204 may obtain a security management key $K_{ASME}$ belonged to the UE 201.

In the step S2012, the NAS security mode command procedure is executed, and during S1 context setup, the step S2013 is executed. The step S2012 includes steps S20121-S20123. In the step S20121, the MME/S-GW 204 execute the KDF, so as to obtain an NAS ciphering key $K_{NAS\ enc}$ and an NAS integrity key $K_{NAS\ int}$ belonged to the UE 201 according to the security management key $K_{ASME}$ belonged to the UE 201.

In the step S20122, the S1 context setup is executed. The MME/S-GW 204 communicates with the RN 202 through the S1 interface, so that the RN 202 obtains an eNB key $K_{eNB}$ belonged to the UE 201. While the step S20122 is executed, the step S2013 is simultaneously executed.

In the step S20123, the UE 201 executes the KDF, so as to obtain the NAS ciphering key $K_{NAS\ enc}$ and the NAS integrity key $K_{NAS\ int}$ belonged to the UE 201 according to the security management key $K_{ASME}$ belonged to the UE 201. An executing sequence of the steps S20121 and S20123 is not limited by the exemplary embodiment of FIG. 13.

The step S2013 includes a step S20131 and a step S20132. When the S1 context setup of the step S20122 is executed, the step S20131 is simultaneously executed, so as to duplicate the eNB key $K_{eNB}$ belonged to the UE 201 to the eNB 203. In the step S20132, the eNB 203 obtains a user plane ciphering key $K_{UP\ enc}$, a radio resource control ciphering key $K_{RRC\ enc}$ and a radio resource control integrity key $K_{RRC\ int}$ belonged to the UE 201 according to the eNB key $K_{eNB}$ belonged to the UE 201. In this way, the security association SA202 can be established between the RN 202 and the eNB 203.

In the step S2014, the AS security mode command procedure is executed, so that a radio resource control security between the UE 201 and the RN 202 is activated. Therefore, the UE 201 and the RN 202 can obtain the user plane ciphering key $K_{UP\ enc}$, the radio resource control ciphering key $K_{RRC\ enc}$ and the radio resource control integrity key $K_{RRC\ int}$ belonged to the UE 201 according to the eNB key $K_{eNB}$ belonged to the UE 201, so as to establish the security association SA201 between the UE 201 and the RN 202.

The user plane ciphering key $K_{UP\ enc}$, the radio resource control ciphering key $K_{RRC\ enc}$ and the radio resource control integrity key $K_{RRC\ int}$ used by the security association SA201 established between the UE 201 and the RN 202 are the same to the user plane ciphering key $K_{UP\ enc}$, the radio resource control ciphering key $K_{RRC\ enc}$ and the radio resource control integrity key $K_{RRC\ int}$ used by the security association SA202 established between the RN 202 and the eNB 203. Therefore, when one of the security associations SA201 and SA202 is updated, another security association could be simultaneously updated.

Figure 14:
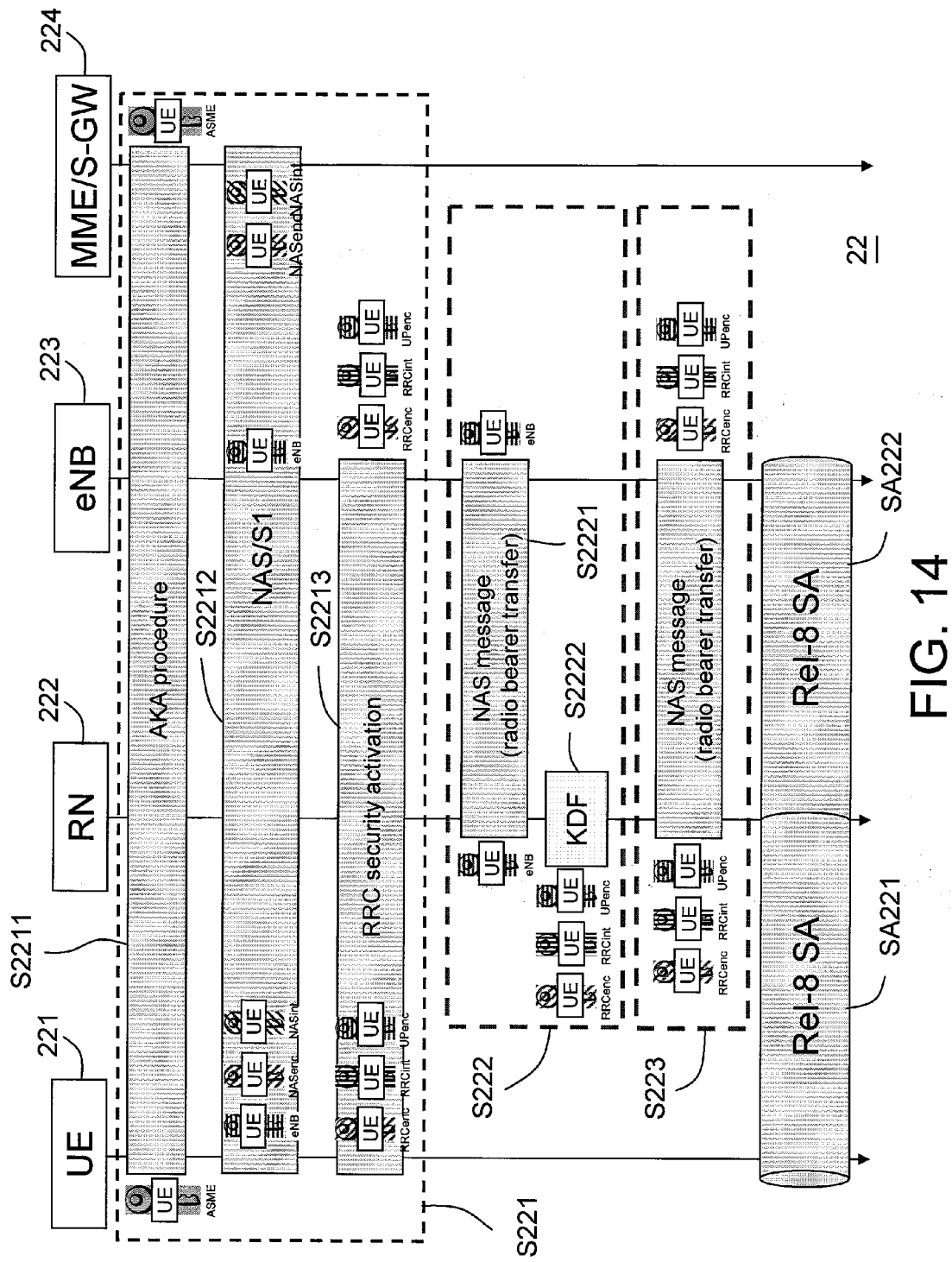
FIG. 14 is a flowchart illustrating a security method in a wireless communication system having a relay node according to another exemplary embodiment of the disclosure.

Referring to FIG. 14, FIG. 14 is a flowchart illustrating a security method in a wireless communication system having a relay node according to another exemplary embodiment of the disclosure. An LTE system 22 includes a UE 221, a RN 222, an eNB 223 and an MME/S-GW 224. In the present exemplary embodiment, the LTE system 22 regards the RN 222 as a user equipment of the eNB 223, and the S1 interface is terminated at the eNB 223. In other words, the RN 222 cannot directly communicate with the MME/S-GW 224 through the S1 interface.

The method of FIG. 14 includes steps S221 and S222, or includes steps S221 and S223. In other words, two possible security methods are simultaneously illustrated in FIG. 14, wherein the steps S221 and S222 represent one of the security methods, and the steps 221 and 223 represent another one of the security methods. Compared to the security method including the steps S221 and S222, the security method including the steps S221 and S223 can simplify a design complexity and reduce a hardware cost of the RN 222. Moreover, in the present exemplary embodiment, the step S222 or the step S223 is executed after the step S221.

In the step S221, a security association SA 221 between the UE 221 and the eNB 223 is established. Due to existence of the RN 222, the step S222 or the step S223 has to be executed to establish security association SA222. In the step S222 or the step S223, the security association SA222 between the RN 222 and the eNB 223 is established.

The step S221 includes steps S2211-S2213. In the step S2211, an AKA procedure is executed (i.e. the UE 221 is authenticated with the MME/S-GW 224 through the eNB 223), so that the UE 221 and the MME/S-GW 224 obtain a security management key $K_{ASME}$ belonged to the UE 221.

In the step S2212, the NAS security mode command procedure is executed, so that the MME/S-GW 224 and the UE 221 obtain an NAS ciphering key $K_{NAS\,enc}$ and an NAS integrity key $K_{NAS\,int}$, and the UE 221 and the eNB 223 obtain an eNB key $K_{eNB}$.

In the step S2213, the AS security mode command procedure is executed, so that the radio resource control security is effectuated. Therefore, the UE 221 and the eNB 223 can obtain a user plane ciphering key $K_{UP\,enc}$ a radio resource control ciphering key $K_{RRC\,enc}$ and a radio resource control integrity key $K_{RRC\,int}$ belonged to the UE 221, so as to establish the security association between the UE 221 and the eNB 223.

The step S222 includes steps S2221 and S2222. In the step S2221, the eNB 223 transmits an NAS message by using a radio bearer transfer, so that the RN 222 obtains the eNB key $K_{eNB}$ belonged to the UE 221, wherein a definition of the NAS message can be referred to 3GPP, which is not repeated therein.

In the step S2222, the RN 222 executes the KDF, so as to obtain the user plane ciphering key $K_{UP\,enc}$, the radio resource control ciphering key $K_{RRC\,enc}$ and the radio resource control integrity key $K_{RRC\,int}$ belonged to the UE 221 according to the eNB key $K_{eNB}$. In this way, the security association SA222 between the RN 222 and the eNB 223 can be established.

Different to the step S222, in the step S223, the eNB 223 is unnecessary to transmit the eNB key $K_{eNB}$ belonged to the UE 221 to the RN 22, so that a security thereof is relatively high. In the step S223, the eNB 223 transmits the NAS message by using the radio bearer transfer, so that the RN 222 obtains the user plane ciphering key $K_{UP\,enc}$, the radio resource control ciphering key $K_{RRC\,enc}$ and the radio resource control integrity key $K_{RRC\,int}$ belonged to the UE 221. In this way, the security association SA222 between the RN 222 and the eNB 223 can be established, and since the RN 222 is unnecessary to execute the KDF, a design complexity and a hardware cost thereof can all be decreased.

The user plane ciphering key $K_{UP\,enc}$, the radio resource control ciphering key $K_{RRC\,enc}$ and the radio resource control integrity key $K_{RRC\,int}$ used by the security association SA221 established between the UE 221 and the RN 222 are the same to the user plane ciphering key $K_{UP\,enc}$, the radio resource control ciphering key $K_{RRC\,enc}$ and the radio resource control integrity key $K_{RRC\,int}$ used by the security association SA222 established between the RN 222 and the eNB 223. Therefore, when one of the security associations SA221 and SA222 is updated, another security association could be simultaneously updated.

Figure 15:
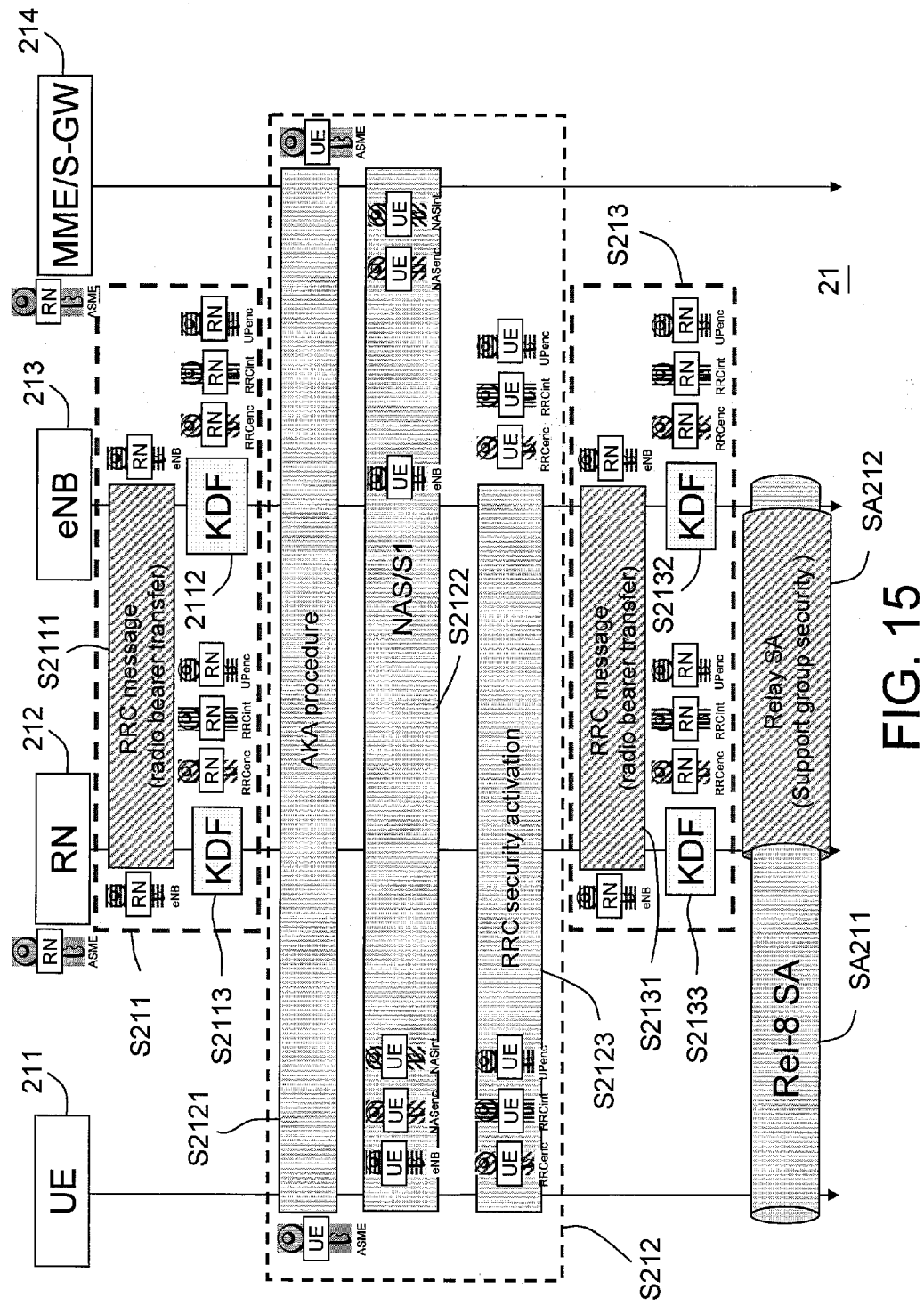
FIG. 15 is a flowchart illustrating a security method in a wireless communication system having a relay node according to another exemplary embodiment of the disclosure.

Referring to FIG. 15, FIG. 15 is a flowchart illustrating a security method in a wireless communication system having a relay node according to another exemplary embodiment of the disclosure. An LTE system 21 includes a UE 211, a RN 212, an eNB 213 and an MME/S-GW 214. In the present exemplary embodiment, the LTE system 21 regards the RN 212 as an eNB, and the S1 interface is terminated at the eNB 213. In other words, the RN 212 cannot directly communicate with the MME/S-GW 214 through the S1 interface.

The method of FIG. 15 includes steps S211 and S212, or includes steps S212 and S213. In other words, two possible security methods are simultaneously illustrated in FIG. 15, wherein the steps S211 and S212 represent one of the security methods that the RN 212 actively provides a security association SA212, and the steps 212 and 213 represent another one of the security methods that the RN 212 passively provides the security association SA212.

The step S212 is the same to the step S221 of FIG. 14, and the steps S2121-S2123 included in the step S212 are also the same to the steps S2211-S2213 included in the step S221, so that detailed descriptions thereof are not repeated. After execution of the step S212 is completed, the eNB 213 and the UE 211 can establish a security association SA211.

In the step S211, after the RN 212 is authenticated with the MME/S-GW 214 through the eNB 213, the RN 212 and the eNB 213 can obtain an eNB key $K_{eNB}$ belonged to the RN 212, and can obtain a user plane ciphering key $K_{UP\,enc}$, a radio resource control ciphering key $K_{RRC\,enc}$ and a radio resource control integrity key $K_{RRC\,int}$ belonged to the RN212 according to the eNB key $K_{eNB}$ belonged to the RN 212. In this way, the security association SA212 between the RN 212 and the eNB 213 can be established.

The step S211 is executed before the step S212, namely, before the security association SA211 is established, the security association SA212 is actively established, so as to facilitate the data and control signal transmission between the RN 212 and the eNB 213. Accordingly, the steps S211 and S212 are referred to as a security method that the RN 212 actively provides the security association SA212.

The step S211 includes steps S2111, S2112 and S2113. In the step S2111, after the RN 212 and the RN 212 is authenticated with the MME/S-GW 214 through the eNB 213, the RN 212 may transmit an RRC message to the eNB 213 by using the radio bearer transfer, so that the RN 212 and the eNB 213 can obtain the eNB key $K_{eNB}$ belonged to the RN 212 according to a security management key $K_{ASME}$ belonged to the RN 212. A definition of the RRC message can be referred to 3GPP, so that a detailed description thereof is not repeated. Besides, the RRC message can be transmitted without using IP transfer.

In the step S2112, the RN 212 executes the KDF, so as to obtain the user plane ciphering key $K_{UP\,enc}$, the radio resource control ciphering key $K_{RRC\,enc}$ and the radio resource control integrity key $K_{RRC\,int}$ belonged to the RN 212 according to the eNB key $K_{eNB}$ belonged to the RN 212.

In the step S2113, the eNB 213 executes the KDF, so as to obtain the user plane ciphering key $K_{UP\,enc}$, the radio resource control ciphering key $K_{RRC\,enc}$ and the radio resource control integrity key $K_{RRC\,int}$ belonged to the RN 212 according to the eNB key $K_{eNB}$ belonged to the RN 212.

An executing sequence of the steps S2113 and S2112 is not limited by the disclosure. Moreover, under a premise that the step S2111 is executed before the steps S2113 and S2112, the executing sequence of the steps S2112 and S2113 of FIG. 15 can be arbitrarily arranged.

The step S213 is executed after execution of the step S212 is completed. Namely, after the security association SA211 is established, the security association SA212 is passively established, so as to facilitate data transmission of the RN 212 and the eNB 213. Accordingly, the steps S212 and S213 are referred to as a security method that the RN 212 passively provides the security association SA212.

The step S213 is the same to the step S211, and steps S2131-S2133 included in the step S213 are also the same to the steps S2111-S2113 included in the step S211, so that detailed descriptions thereof are not repeated. It should be notice that a executing sequence of the step S2132 and the step S2133 is not limited. Besides, in the exemplary embodiment of FIG. 15, the security association SA212 may also support group security.

Moreover, in the above step S211 or S213, transmission of the eNB key $K_{eNB}$ belonged to the RN 212 can be unnecessary. In the step S211 or the step S213, after the RN 212 is authenticated with the MME/S-GW 214 through the eNB 213, the RN 212 transmits the RRC message to the eNB 213 by using the radio bearer transfer, so that the eNB 213 can obtain the user plane ciphering key $K_{UP\,enc}$, the radio resource control ciphering key $K_{RRC\,enc}$ and the radio resource control integrity key $K_{RRC\,int}$ belonged to the RN 212.

Figure 16:
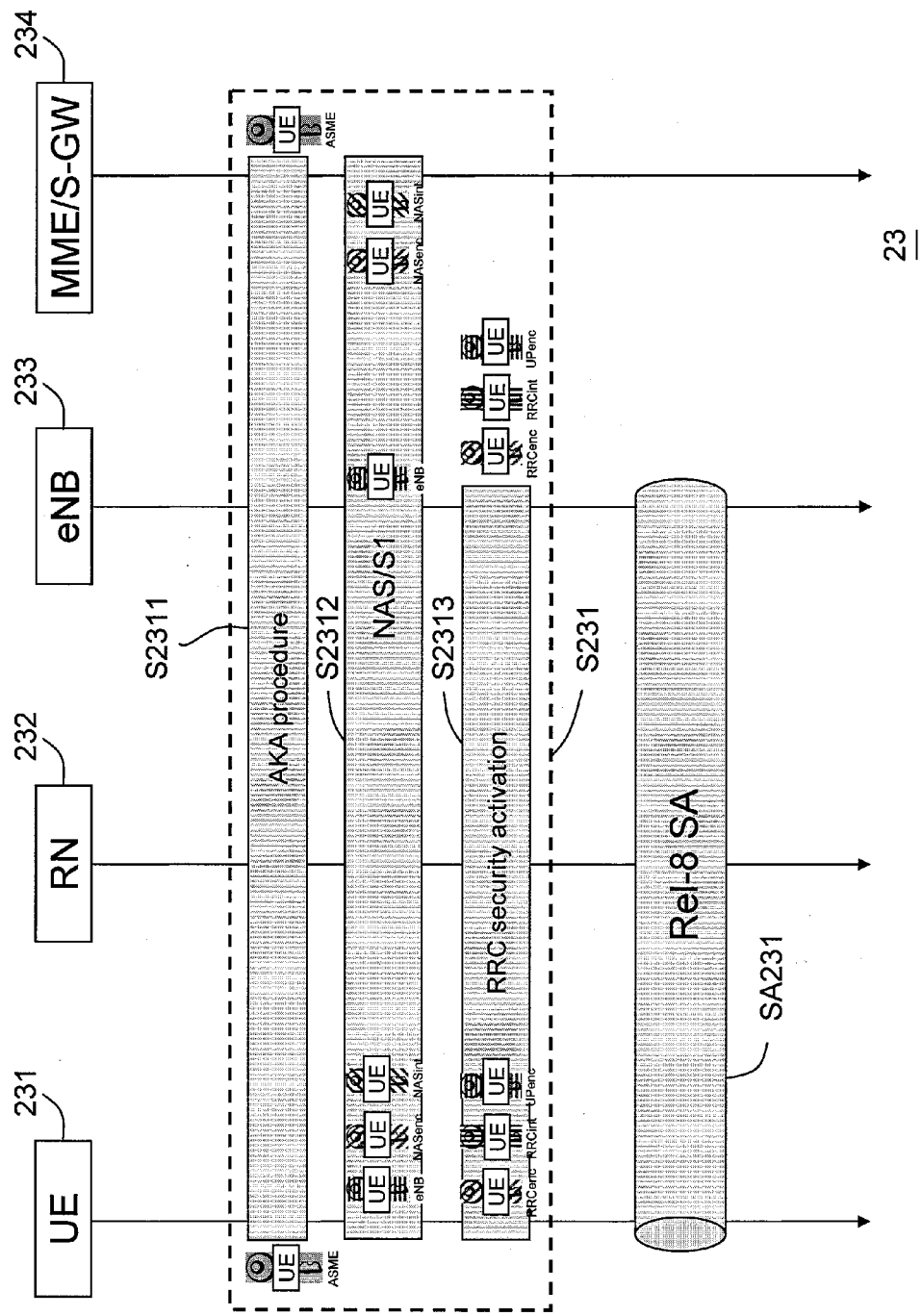
FIG. 16 is a flowchart illustrating a security method in a wireless communication system having a relay node according to another exemplary embodiment of the disclosure.

Referring to FIG. 16, FIG. 16 is a flowchart illustrating a security method in a wireless communication system having a relay node according to another exemplary embodiment of the disclosure. An LTE system 23 includes a UE 231, a RN 232, an eNB 233 and an MME/S-GW 234. In the present exemplary embodiment, the S1 interface is terminated at the eNB 233. In other words, the RN 232 cannot directly communicate with the MME/S-GW 234 through the S1 interface.

A step S231 of the present exemplary embodiment is the same to the step S221 of FIG. 14, and steps S2311-S2313 included in the step S231 are the same to the steps S2211-S2213 included in the step S221, so that detailed descriptions thereof are not repeated. After execution of the step S231 is completed, the eNB 233 and the UE 231 can establish a security association SA231.

The exemplary embodiment of FIG. 16 provides a transparent security method, in FIG. 16, the RN 232 transparently transfers data and control signals transmitted between the user equipment and the base station node without performing an encryption/decryption operation on the data and control signals. The security method of FIG. 16 can greatly reduce a hardware cost and a design complexity of the RN 232.

In summary, exemplary embodiments of the disclosure provide a plurality of security methods for a wireless communication system having a relay node, and the security methods provide the security association between the relay node and the user equipment or between the user equipment and the base station, and the security association between the relay node and the base station node. Therefore, a security association between the user equipment and the base station node that perform data and control signal transmission with assistant of the relay node can be established. Moreover, according to a part of the above security methods, a hardware cost and a design complexity of the relay node can be reduced, or high security and group security, etc. can be achieved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A security method in a wireless communication system, for providing a plurality of security associations between a user equipment, a relay node, and a base station node in the wireless communication system, and the security method comprising:

authenticating with a serving gateway in the wireless communication system by the user equipment though the relay node, so as to establish a first security association between the user equipment and the relay node; and establishing a second security association between the relay node and the base station node by the relay node through the base station node, wherein the step of establishing the first security association comprises:

executing a first authentication procedure with the serving gateway by the user equipment through the relay node;

executing a first far-end data security mode command procedure with the serving gateway by the user equipment through the relay node, so that data and control signals transmitted between the user equipment and the serving gateway obtain security protection; and executing a first near-end data security mode command procedure by the user equipment and the relay node, so as to establish the first security association, so that data and control signals transmitted between the user equipment and the relay node obtain security protection.

2. The security method as claimed in claim 1, wherein the wireless communication system is a long term evolution system, the first authentication procedure is a first authentication and key agreement procedure, the first far-end data security mode command procedure is a first non-access layer security mode command procedure, and the first near-end data security mode command procedure is a first access layer security mode command procedure.

3. The security method as claimed in claim 2, wherein after the first authentication and key agreement procedure is executed, the user equipment and the serving gateway obtain a first security management key belonged to the user equipment; after the first non-access layer security mode command procedure is executed, the user equipment and the serving gateway obtain a first non-access layer ciphering key and a first non-access layer integrity key belonged to the user equipment according to the first security management key, and the relay node and the user equipment obtain a first base station node key belonged to the user equipment; and after the first access layer security mode command procedure is executed, the relay node and user equipment obtain a first radio resource control ciphering key, a first radio resource control integrity key and a first user plane ciphering key belonged to the user equipment according to the first base station node key.

4. The security method as claimed in claim 3, wherein the step of establishing the second security association comprises:

obtaining the first base station node key by the base station node while the serving gateway transmits the first base station node key to the relay node; and executing a key derivation function by the base station node, so that the base station node obtains the first radio resource control ciphering key, the first radio resource control integrity key and the first user plane ciphering key according to the first base station node key.

5. The security method as claimed in claim 1, wherein the relay node authenticates with the serving gateway through the base station node, so as to establish the second security association.

6. The security method as claimed in claim 1, wherein the step of establishing the second security association comprises:

executing a second authentication procedure with the serving gateway by the relay node through the base station node;

executing a second far-end data security mode command procedure with the serving gateway by the relay node through the base station node, so that data and control signals transmitted between the relay node and the serving gateway obtain security protection; and executing a second near-end data security mode command procedure by the relay node and the base station node, so as to establish the second security association, so that data and control signals transmitted between the relay node and the base station node obtain security protection.

7. The security method as claimed in claim 6, wherein the wireless communication system is a long teen evolution system, the second authentication procedure is a second authentication and key agreement procedure, the second far-end data security mode command procedure is a second non-access layer security mode command procedure, and the second near-end data security mode command procedure is a second access layer security mode command procedure.

8. The security method as claimed in claim 7, wherein after the second authentication and key agreement procedure is executed, the relay node and the serving gateway obtain a second security management key belonged to the relay node; after the second non-access layer security mode command procedure is executed, the relay node and the serving gateway obtain a second non-access layer ciphering key and a second non-access layer integrity key belonged to the relay node according to the second security management key, and the base station node and the relay node obtain a second base station node key belonged to the relay node; and after the second access layer security mode command procedure is executed, the base station node and the relay node obtain a second radio resource control ciphering key, a second radio resource control integrity key and a second user plane ciphering key belonged to the relay node according to the second base station node key.

9. The security method as claimed in claim 6, wherein the second security association supports group security.

10. The security method as claimed in claim 1, wherein the step of establishing the second security association comprises:

transferring a transmission control message through a transmission interface between the relay node and the base station node, so that the relay node and the base station node obtain a second base station node key belonged to the relay node;

executing a key derivation function by the base station node, so that the base station node obtains a second radio resource control ciphering key, a second radio resource control integrity key and a second user plane ciphering key belonged to the relay node according to the second base station node key; and executing the key derivation function by the relay node, so that the relay node obtains the second radio resource control ciphering key, the second radio resource control integrity key and the second user plane ciphering key according to the second base station node key.

11. The security method as claimed in claim 10, wherein the wireless communication system is a long teen evolution system, when the transmission interface is an S1 interface, the transmission control message is an S1-AP message, and when the transmission interface is an X2 interface, the transmission control message is an X2-AP message.

12. The security method as claimed in claim 10, wherein the second security association supports group security.

13. The security method as claimed in claim 1, wherein the step of establishing the second security association comprises:

transferring a transmission control message through a transmission interface between the relay node and the base station node, so that the base station node obtains a second radio resource control ciphering key, a second radio resource control integrity key and a second user plane ciphering key belonged to the relay node without obtaining a second base station node key belonged to the relay node.

14. The security method as claimed in claim 13, wherein the wireless communication system is a long term evolution system, when the transmission interface is an S1 interface, the transmission control message is an S1-AP message, and when the transmission interface is an X2 interface, the transmission control message is an X2-AP message.

15. The security method as claimed in claim 13, wherein the second security association supports group security.

16. The security method as claimed in claim 1, wherein the step of establishing the second security association comprises:

transferring a transmission control message a transmission interface between the relay node and the base station node through, so that the base station node obtains a first base station node key belonged to the user equipment;

executing a key derivation function by the base station node, so that the base station node obtains a first radio resource control ciphering key, a first radio resource control integrity key and a first user plane ciphering key belonged to the user equipment according to the first base station node key.

17. The security method as claimed in claim 16, wherein the wireless communication system is a long term evolution system, when the transmission interface is an S1 interface, the transmission control message is an S1-AP message, and when the transmission interface is an X2 interface, the transmission control message is an X2-AP message.

18. The security method as claimed in claim 1, wherein the step of establishing the second security association comprises:

transferring a transmission control message between the relay node and the base station node through a transmission interface, so that the base station node obtains a first radio resource control ciphering key, a first radio resource control integrity key and a first user plane ciphering key belonged to the user equipment without obtaining a first base station node key belonged to the user equipment.

19. The security method as claimed in claim 18, wherein the wireless communication system is a long term evolution system, when the transmission interface is an S1 interface, the transmission control message is an S1-AP message, and when the transmission interface is an X2 interface, the transmission control message is an X2-AP message.

20. A security method in a wireless communication system, for providing a plurality of security associations between a user equipment, a relay node, and a base station node in the wireless communication system, and the security method comprising:

authenticating with a serving gateway in the wireless communication system by the user equipment through the base station node, so as to establish a first security association between the user equipment and the base station node; and establishing a second security association between the relay node and the base station node by the relay node through the base station node, wherein the step of establishing the first security association comprises:

executing a first authentication procedure with the serving gateway by the user equipment through the base station node;

executing a first far-end data security mode command procedure with the serving gateway by the user equipment through the base station node, so that data and control signals transmitted between the user equipment and the serving gateway obtain security protection; and executing a first near-end data security mode command procedure by the user equipment and the base station node, so as to establish the first security association, so that data and control signals transmitted between the user equipment and the base station node obtain security protection.

21. The security method as claimed in claim 20, wherein the wireless communication system is a long term evolution system, the first authentication procedure is a first authentication and key agreement procedure, the first far-end data security mode command procedure is a first non-access layer security mode command procedure, and the first near-end data security mode command procedure is a first access layer security mode command procedure.

22. The security method as claimed in claim 21, wherein after the first authentication and key agreement procedure is executed, the user equipment and the serving gateway obtain a first security management key belonged to the user equipment; after the first non-access layer security mode command procedure is executed, the user equipment and the serving gateway obtain a first non-access layer ciphering key and a first non-access layer integrity key belonged to the user equipment according to the first security management key, and the base station node and the user equipment obtain a first base station node key belonged to the user equipment; and after the first access layer security mode command procedure is executed, the base station node and the user equipment obtain a first radio resource control ciphering key, a first radio resource control integrity key and a first user plane ciphering key belonged to the user equipment according to the first base station node key.

23. The security method as claimed in claim 20, wherein the step of establishing the second security association comprises:

transferring a NAS message through a radio bearer transfer between the base station node and the relay node, so that the relay node obtains a first base station node key belonged to the user equipment;

executing a key derivation function by the relay node, so that the relay node obtains a first radio resource control ciphering key, a first radio resource control integrity key and a first user plane ciphering key belonged to the user equipment according to the first base station node key.

24. The security method as claimed in claim 20, wherein the step of establishing the second security association comprises:

transferring a NAS message through a radio bearer transfer between the base station node and the relay node, so that the relay node obtains a first radio resource control ciphering key, a first radio resource control integrity key and a first user plane ciphering key belonged to the base station node without obtaining a first base station node key belonged to the base station node.

25. The security method as claimed in claim 20, wherein the step of establishing the second security association comprises:

transferring a RRC message through a radio bearer transfer between the base station node and the relay node, so that the relay node obtains a second base station node key belonged to the relay node;

executing a key derivation function by the relay node, so that the relay node obtains a second radio resource control ciphering key, a second radio resource control integrity key and a second user plane ciphering key belonged to the relay node according to the second base station node key.

26. The security method as claimed in claim 25, wherein the second security association supports group security.

27. The security method as claimed in claim 20, wherein the step of establishing the second security association comprises:

transferring a RRC message through a radio bearer transfer between the base station node and the relay node, so that the relay node obtains a second radio resource control ciphering key, a second radio resource control integrity key and a second user plane ciphering key belonged to the relay node without obtaining a second base station node key belonged to the relay node.

28. The security method as claimed in claim 27, wherein the second security association supports group security.

29. A security method in a wireless communication system, for providing a plurality of security associations between a user equipment, a relay node, and a base station node in the wireless communication system, and the security method comprising:

performing authentication with a serving gateway in the wireless communication system by the relay node through the base station node, so as to obtain a first security management key belonged to the relay node;

executing a first far-end data security mode command procedure by the relay node, so as to obtain a first far-end data ciphering key, a first far-end data integrity key and a first base station node key belonged to the relay node according to the first security management key;

executing a first near-end data security mode command procedure by the relay node, so as to obtain a first near-end data ciphering key, a first near-end control signal ciphering key and a first near-end control signal integrity key belonged to the relay node according to the first base station node key, and accordingly establish a first security association between the relay node and the base station node;

authenticating with the serving gateway by the user equipment through the relay node, so that the user equipment obtains a second security management key belonged to the user equipment;

after the user equipment executes a second far-end data security mode command procedure, obtaining a second base station node key belonged to the user equipment by the relay node, wherein the second base station node key is generated according to the second security management key; and after the user equipment executes a second near-end data security mode command procedure, obtaining a second near-end data ciphering key, a second near-end control signal ciphering key and a second near-end control signal integrity key belonged to the user equipment by the relay node according to the second base station node key, so as to establish a second security association between the user equipment and the relay node.

30. A security method in a wireless communication system, for providing a plurality of security associations between a user equipment, a relay node, and a base station node in the wireless communication system, and the security method comprising:

obtaining a first base station node key belonged to the relay node by the base station node through a transmission interface between the base station node and the relay node, so that the relay node and the base station node obtain a first near-end data ciphering key, a first near-end control signal ciphering key and a first near-end control signal integrity key belonged to the relay node according to the first base station node key, so as to establish a first security association between the relay node and the base station node, wherein the first base station node key is generated according to a first security management key belonged to the relay node;

authenticating with a serving gateway in the wireless communication system by the user equipment through the relay node, so that the user equipment obtains a second security management key belonged to the user equipment;

after the user equipment executes a second far-end data security mode command procedure, obtaining a second base station node key belonged to the user equipment by the relay node, wherein the second base station node key is generated according to the second security management key; and after the user equipment executes a second near-end data security mode command procedure, obtaining a second near-end data ciphering key, a second near-end control signal ciphering key and a second near-end control signal integrity key belonged to the user equipment by the relay node according to the second base station node key, so as to establish a second security association between the user equipment and the relay node.

31. A security method in a wireless communication system, for providing a plurality of security associations between a user equipment, a relay node, and a base station node in the wireless communication system, and the security method comprising authenticating with a serving gateway in the wireless communication system by the user equipment through the relay node, so that the user equipment obtains a security management key belonged to the user equipment;

after the user equipment executes a far-end data security mode command procedure, obtaining a base station node key belonged to the user equipment by the relay node, wherein the base station node key is generated according to the security management key;

after the user equipment executes a near-end data security mode command procedure, obtaining a near-end data ciphering key, a near-end control signal ciphering key and a near-end control signal integrity key belonged to the user equipment by the relay node according to the base station node key, so as to establish a first security association between the user equipment and the relay node; and obtaining the base station node key by the base station node through a transmission interface between the base station node and the relay node, so that the base station node obtains the near-end data ciphering key, the near-end control signal ciphering key and the near-end control signal integrity key according to the base station node key, so as to establish a second security association between the relay node and the base station node.

32. A security method in a wireless communication system, for providing a security association between a user equipment, a relay node, and a base station node in the wireless communication system, and the security method comprising:

authenticating with a serving gateway in the wireless communication system by the user equipment through the relay node, so that the user equipment obtains a security management key belonged to the user equipment;

after the user equipment executes a far-end data security mode command procedure, obtaining a base station node key belonged to the user equipment by the relay node, wherein the base station node key is generated according to the security management key;

after the user equipment executes a near-end data security mode command procedure, obtaining a near-end data ciphering key, a near-end control signal ciphering key and a near-end control signal integrity key belonged to the user equipment by the relay node according to the base station node key, so as to establish the security association between the user equipment and the relay node; and obtaining the near-end data ciphering key, the near-end control signal ciphering key and the near-end control signal integrity key by the base station node through a transmission interface between the base station node and the relay node, so as to establish a second security association between the relay node and the base station node.

33. A security method in a wireless communication system, for providing a plurality of security associations between a user equipment, a relay node, and a base station node in the wireless communication system, and the security method comprising:

obtaining a first near-end data ciphering key, a first near-end control signal ciphering key and a first near-end control signal integrity key belonged to the relay node by the base station node through a transmission interface between the base station node and the relay node, so as to establish a first security association between the relay node and the base station node, wherein a first base station node key belonged to the relay node is generated according to a first security management key belonged to the relay node, and the first near-end data ciphering key, the first near-end control signal ciphering key and the first near-end control signal integrity key are generated according to the first base station node key;

authenticating with a serving gateway in the wireless communication system by the user equipment through the relay node, so that the user equipment obtains a second security management key belonged to the user equipment;

after the user equipment executes a second far-end data security mode command procedure, obtaining a second base station node key belonged to the user equipment by the relay node, wherein the second base station node key is generated according to the second security management key; and after the user equipment executes a second near-end data security mode command procedure, obtaining a second near-end data ciphering key, a second near-end control signal ciphering key and a second near-end control signal integrity key belonged to the user equipment by the relay node according to the second base station node key, so as to establish a second security association between the user equipment and the relay node.

34. A security method in a wireless communication system, for providing a plurality of security associations between a user equipment, a relay node, and a base station node in the wireless communication system, and the security method comprising:

authenticating with a serving gateway in the wireless communication system by the user equipment through the relay node, so that the user equipment obtains a security management key belonged to the user equipment;

after the user equipment executes a far-end data security mode command procedure, obtaining a base station node key belonged to the user equipment by the relay node, wherein the base station node key is generated according to the security management key;

after the user equipment executes a near-end data security mode command procedure, obtaining a near-end data ciphering key, a near-end control signal ciphering key and a near-end control signal integrity key belonged to the user equipment by the relay node according to the base station node key, so as to establish a first security association between the user equipment and the relay node;

when the user equipment executes the far-end data security mode command procedure, obtaining the base station node key generated according to the security management key by the base station; and obtaining the near-end data ciphering key, the near-end control signal ciphering key and the near-end control signal integrity key by the base station node according to the base station node key, so as to establish a second security association between the relay node and the base station node.

35. A security method in a wireless communication system, for providing a plurality of security associations between a user equipment, a relay node, and a base station node in the wireless communication system, and the security method comprising:

performing authentication with a serving gateway in the wireless communication system by the user equipment through the base station node, so as to obtain a security management key belonged to the user equipment;

executing a far-end data security mode command procedure by the user equipment, so as to obtain a far-end data ciphering key, a far-end data integrity key and a base station node key belonged to the user equipment according to the security management key;

executing a near-end data security mode command procedure by the user equipment, so as to obtain a near-end data ciphering key, a near-end control signal ciphering key and a near-end control signal integrity key belonged to the user equipment according to the base station node key, and accordingly establish a first security association between the user equipment and the base station node; and obtaining the near-end data ciphering key, the near-end control signal ciphering key and the near-end control signal integrity key by the relay node through a radio bearer transfer between the base station node and the relay node, so as to establish a second security association between the relay node and the base station node.

36. A security method in a wireless communication system, for providing a plurality of security associations between a user equipment, a relay node, and a base station node in the wireless communication system, and the security method comprising:

performing authentication with a serving gateway in the wireless communication system by the user equipment through the base station node, so as to obtain a security management key belonged to the user equipment;

executing a far-end data security mode command procedure by the user equipment, so as to obtain a far-end data ciphering key, a far-end data integrity key and a base station node key belonged to the user equipment according to the security management key;

executing a near-end data security mode command procedure by the user equipment, so as to obtain a near-end data ciphering key, a near-end control signal ciphering key and a near-end control signal integrity key belonged to the user equipment according to the base station node key, and accordingly establish a first security association between the user equipment and the base station node; and obtaining the base station node key by the relay node through a radio bearer transfer between the base station node and the relay node, so that the relay node obtains the near-end data ciphering key, the near-end control signal ciphering key and the near-end control signal integrity key according to the base station node key, so as to establish a second security association between the relay node and the base station node.

37. A security method in a wireless communication system, for providing a plurality of security associations between a user equipment, a relay node, and a base station node in the wireless communication system, and the security method comprising:

performing authentication with a serving gateway in the wireless communication system by the user equipment through the base station node, so as to obtain a first security management key belonged to the user equipment;

executing a first far-end data security mode command procedure by the user equipment, so as to obtain a first far-end data ciphering key, a first far-end data integrity key and a first base station node key belonged to the user equipment according to the first security management key;

executing a first near-end data security mode command procedure by the user equipment, so as to obtain a first near-end data ciphering key, a first near-end control signal ciphering key and a first near-end control signal integrity key belonged to the user equipment according to the first base station node key, and accordingly establish a first security association between the user equipment and the base station node; and obtaining a second base station node key belonged to the relay node by the base station node through a radio bearer transfer between the base station node and the relay node, so that the relay node and the base station node obtain a second near-end data ciphering key, a second near-end control signal ciphering key and a second near-end control signal integrity key belonged to the relay node according to the second base station node key, so as to establish a second security association between the relay node and the base station node, wherein the second base station node key is generated according to a second security management key belonged to the relay node.

38. A security method in a wireless communication system, for providing a plurality of security associations between a user equipment, a relay node, and a base station node in the wireless communication system, and the security method comprising:

performing authentication with a serving gateway in the wireless communication system by the user equipment through the base station node, so as to obtain a security management key belonged to the user equipment;

executing a far-end data security mode command procedure by the user equipment, so as to obtain a far-end data ciphering key, a far-end data integrity key and a base station node key belonged to the user equipment according to the security management key;

executing a near-end data security mode command procedure by the user equipment, so as to obtain a near-end data ciphering key, a near-end control signal ciphering key and a near-end control signal integrity key belonged to the user equipment according to the base station node key, and accordingly establish a first security association between the user equipment and the base station node; and transparently transferring data and control signals transmitted between the user equipment and the base station node by the relay node without performing an encryption/decryption operation on the data and control signals.

\* \* \* \* \*